July 20, 1943.  W. F. NEWHOUSE ET AL  2,324,530
MACHINE FOR FORMING LOOPS ON THE ENDS OF
THE WIRES OF WIREBOUND BOXES
Filed Aug. 3, 1940  16 Sheets-Sheet 1

Inventors:
Walter F. Newhouse
Leslie M. Hile
By Arthur F. Durand

July 20, 1943.  W. F. NEWHOUSE ET AL  2,324,530
MACHINE FOR FORMING LOOPS ON THE ENDS OF
THE WIRES OF WIREBOUND BOXES
Filed Aug. 3, 1940  16 Sheets-Sheet 3

Inventors:
Walter F. Newhouse
Leslie M Hile
By Arthur H. Durand, atty.

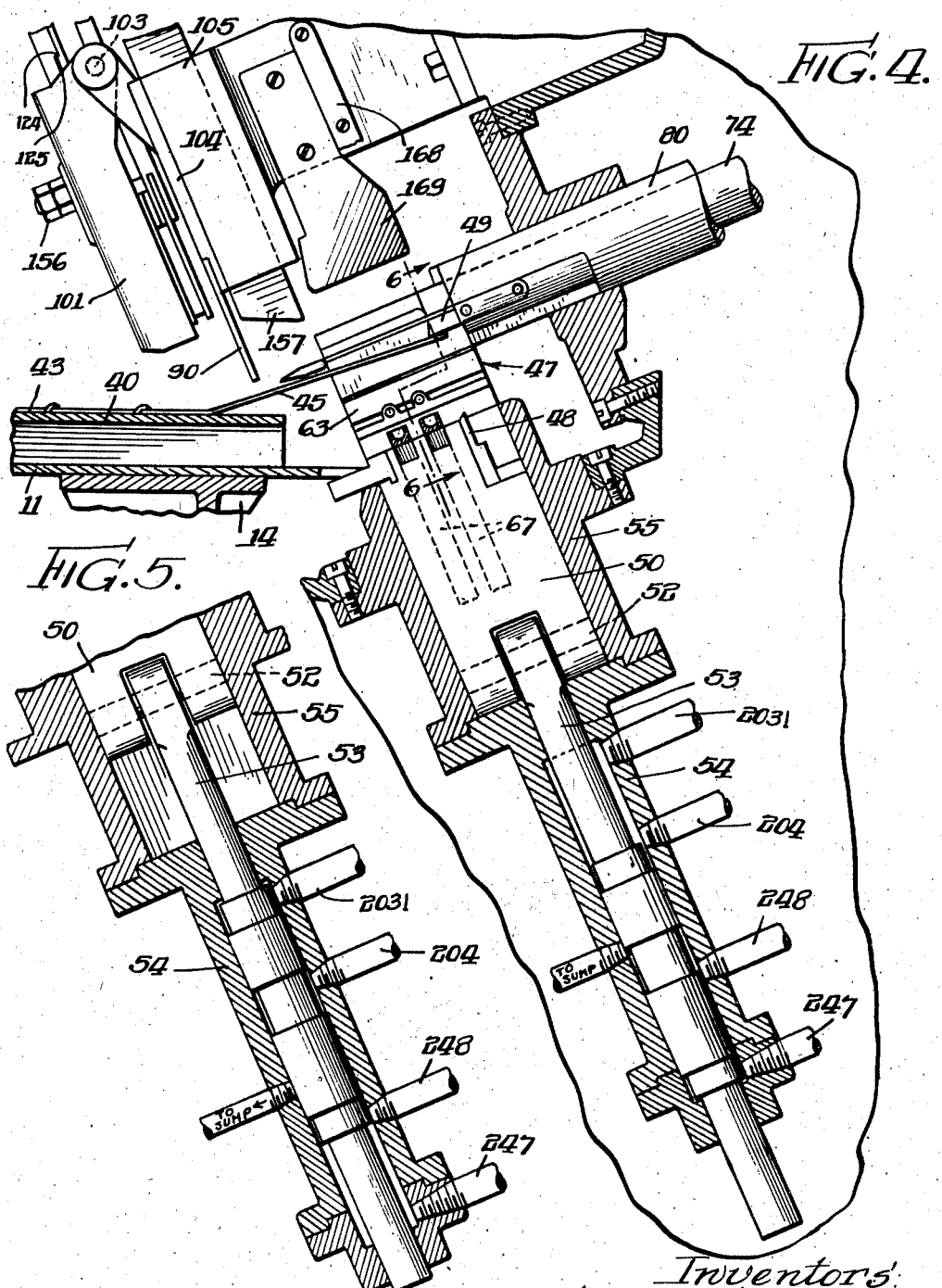

July 20, 1943.   W. F. NEWHOUSE ET AL   2,324,530
MACHINE FOR FORMING LOOPS ON THE ENDS OF
THE WIRES OF WIREBOUND BOXES
Filed Aug. 3, 1940   16 Sheets-Sheet 5
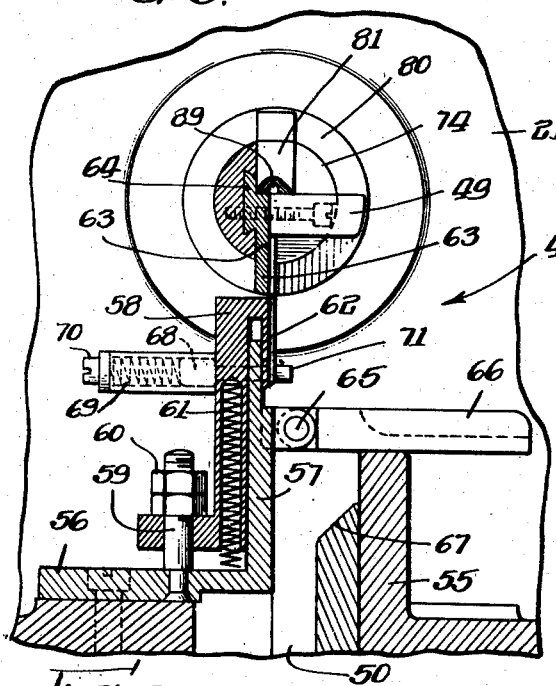
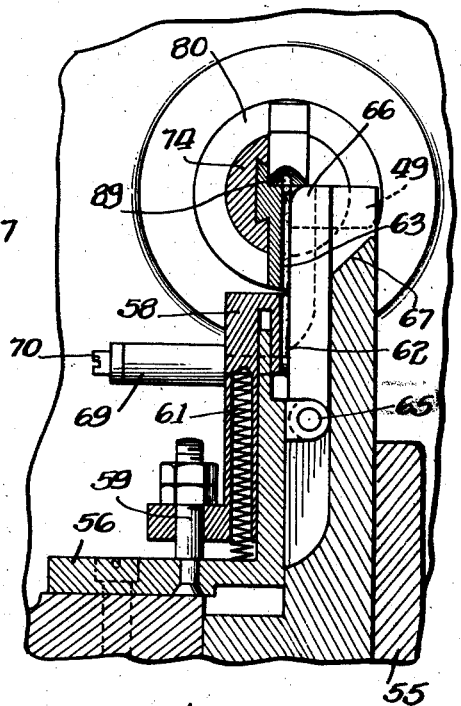
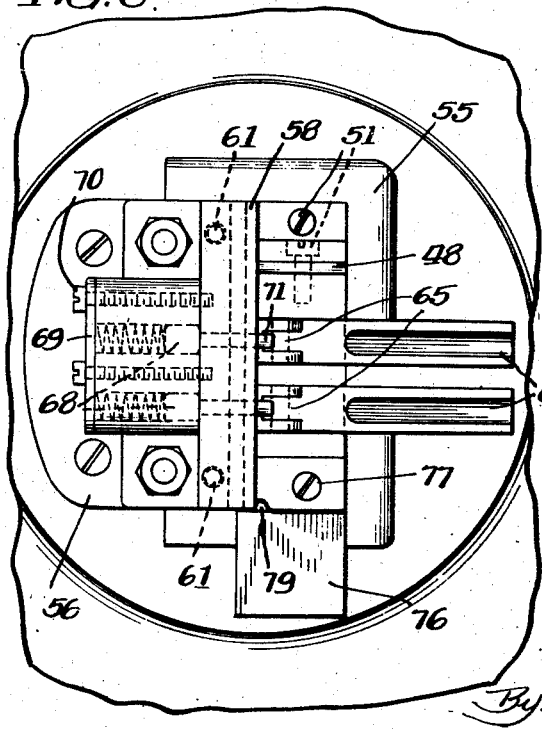
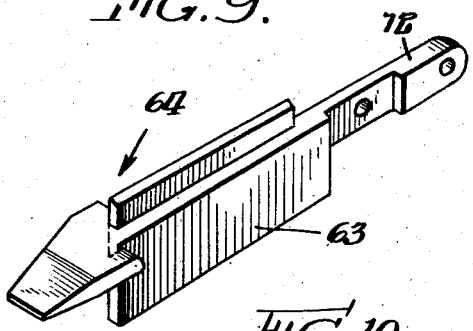
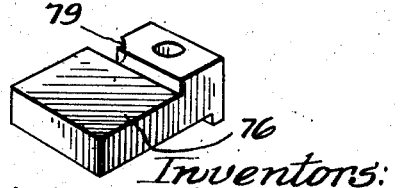
Inventors:
Walter F. Newhouse
Leslie M. Hile
By Arthur H. Durand atty.

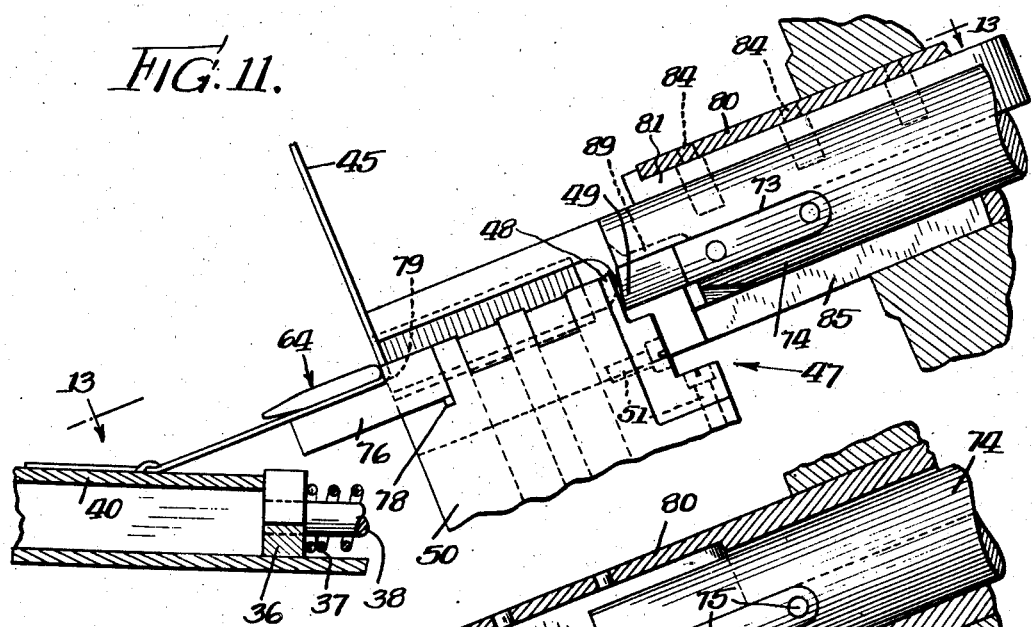
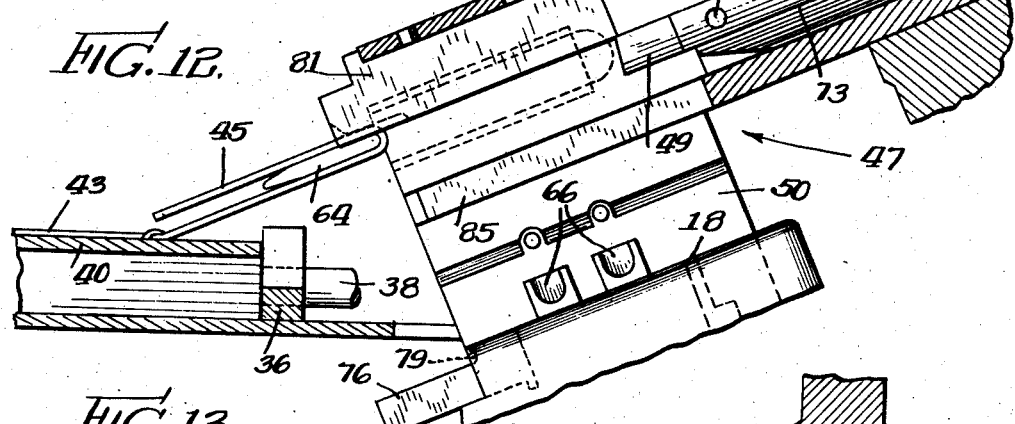
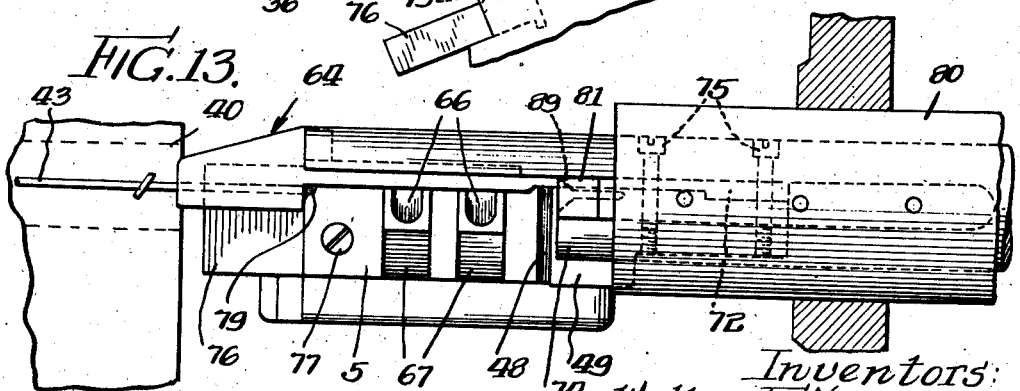

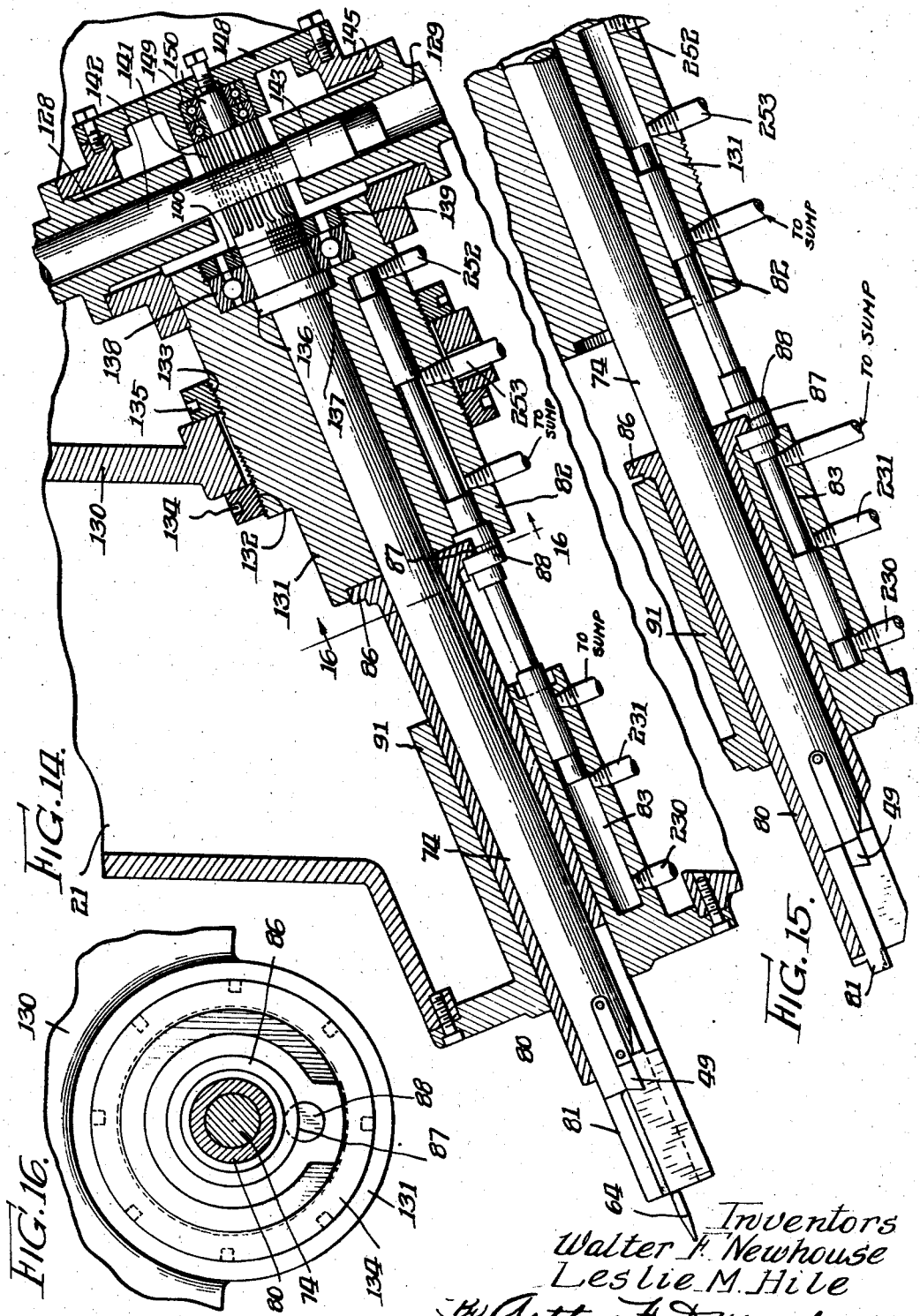

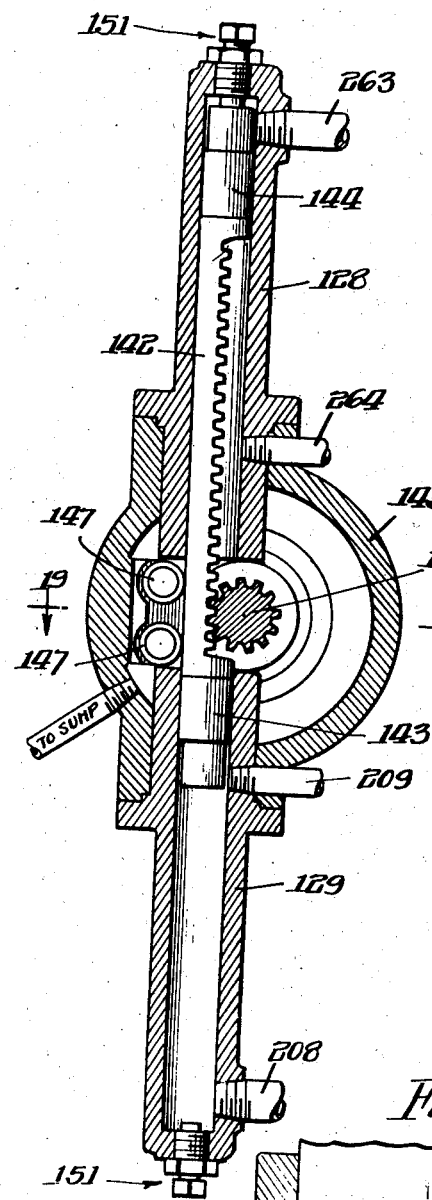
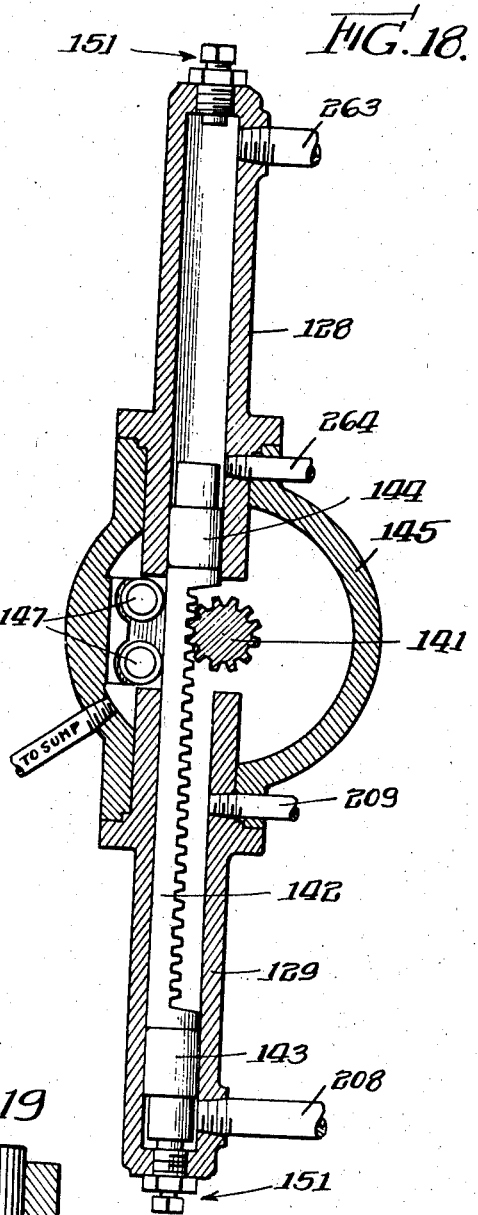
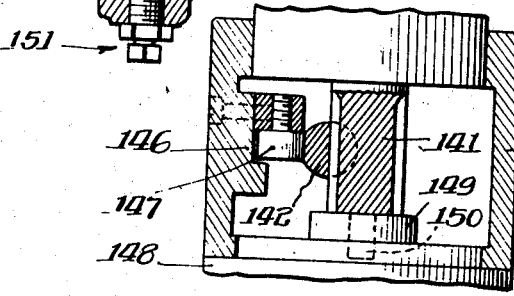

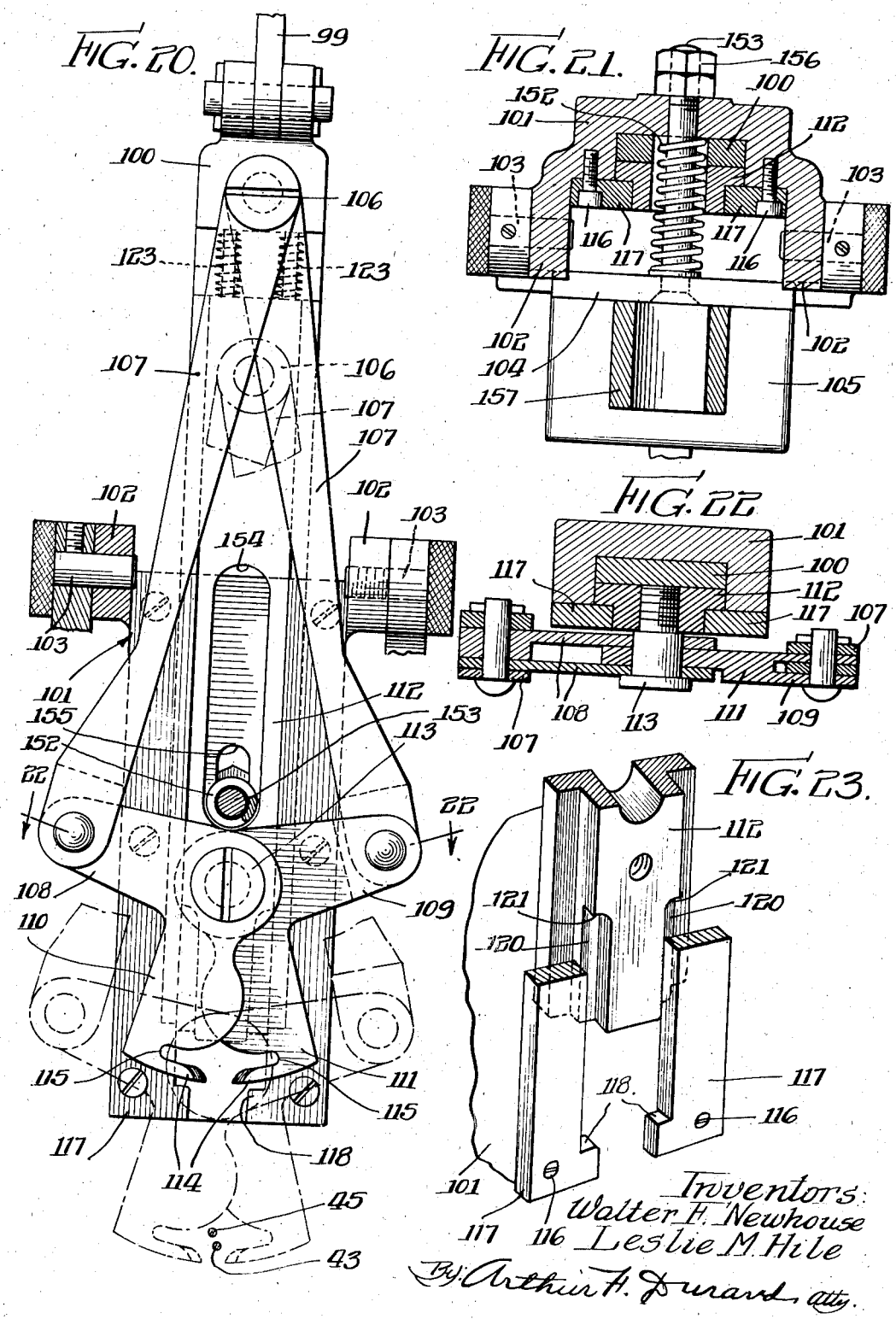

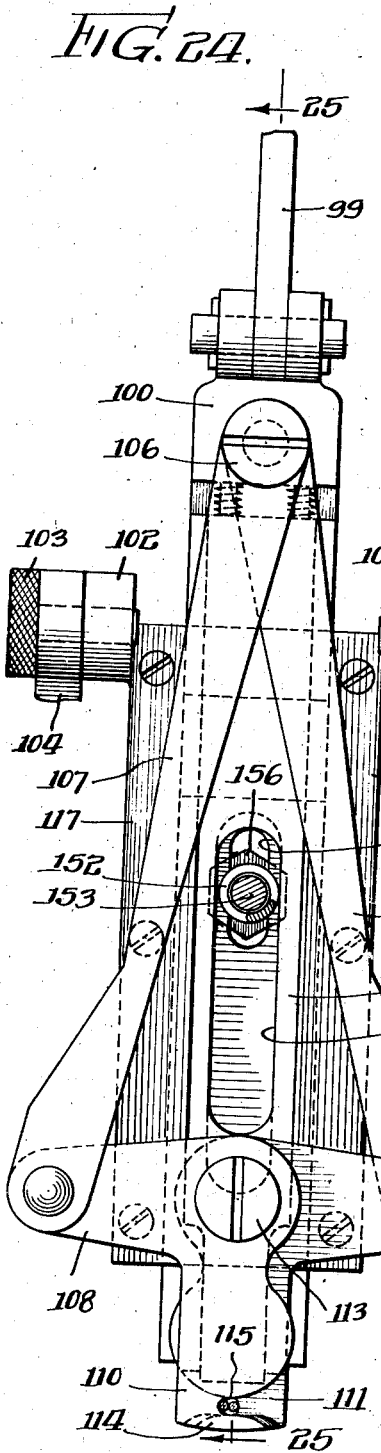
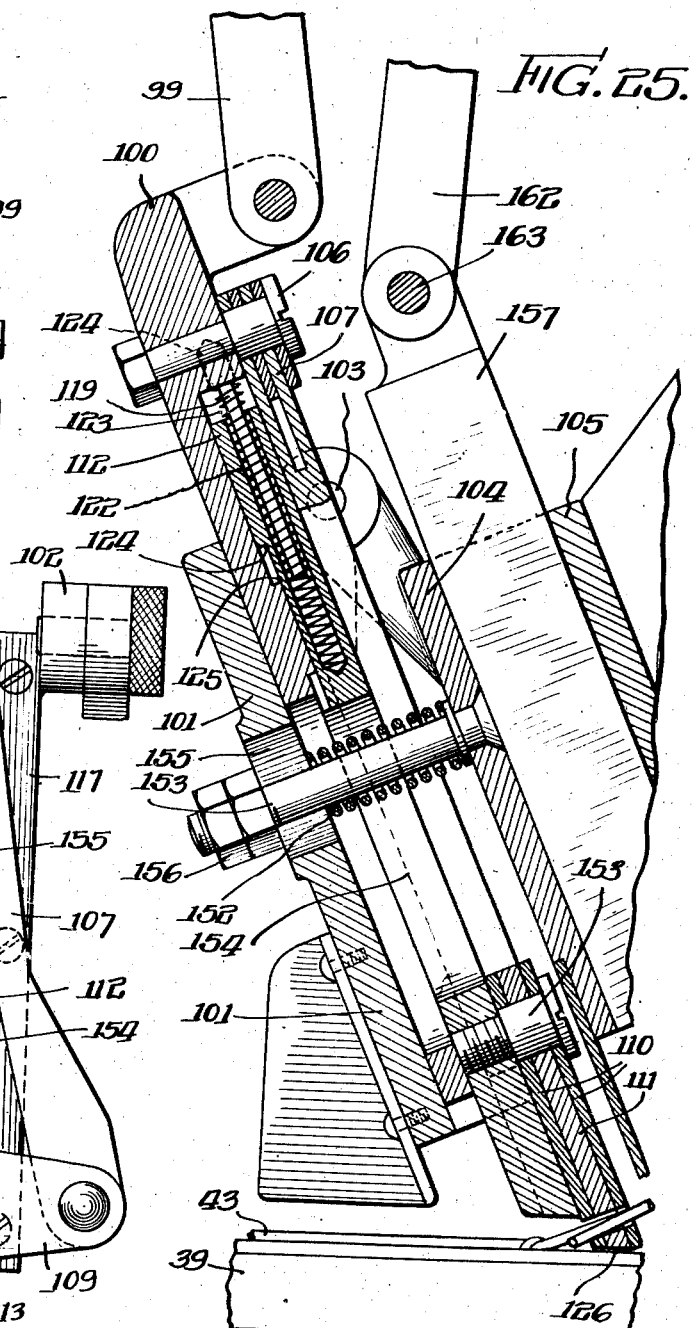

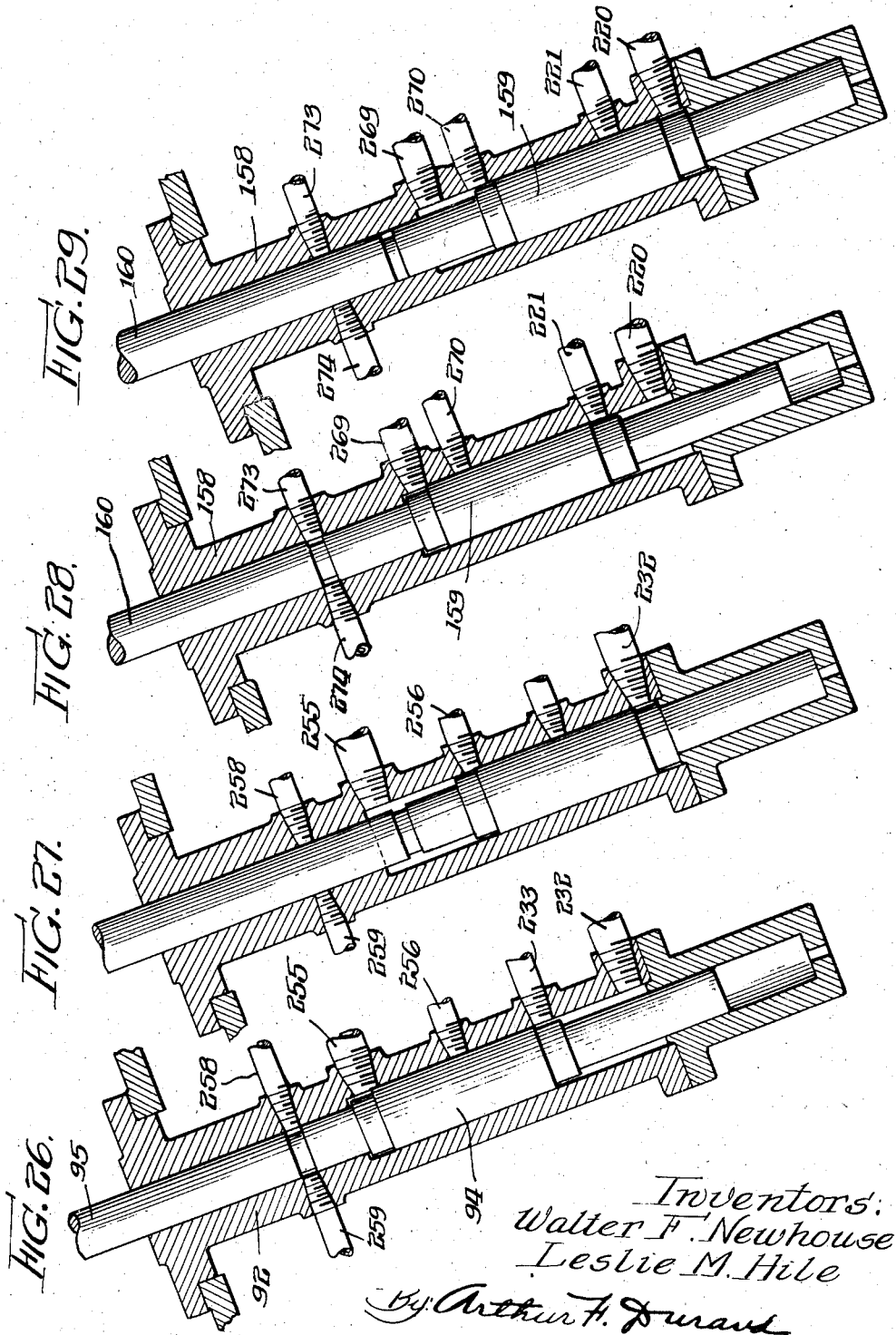

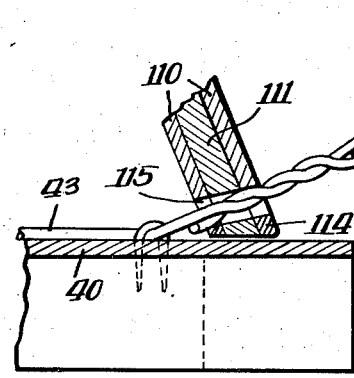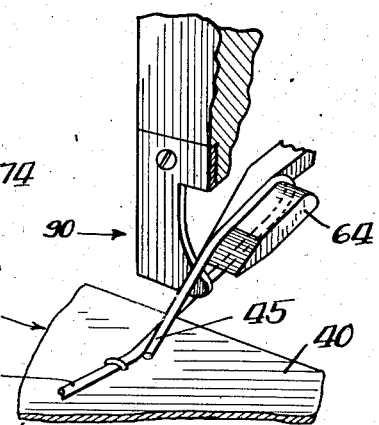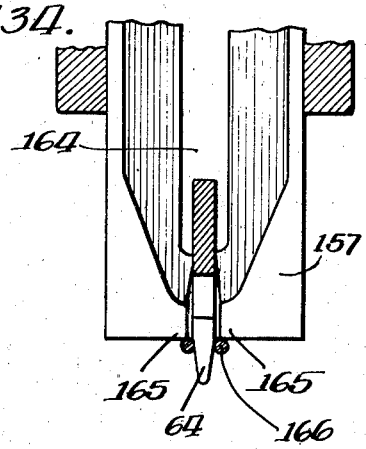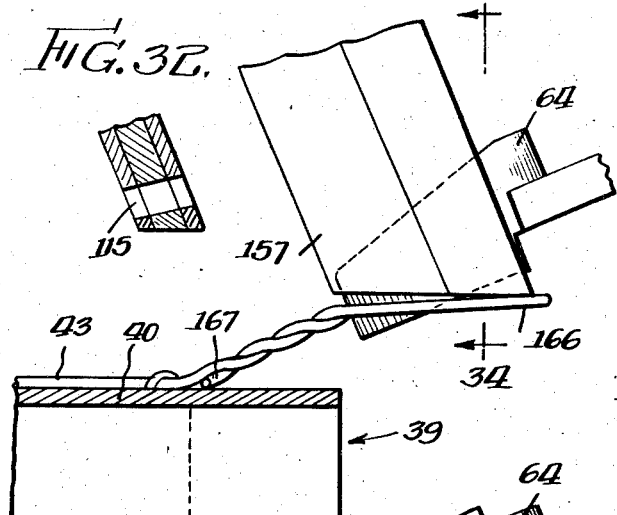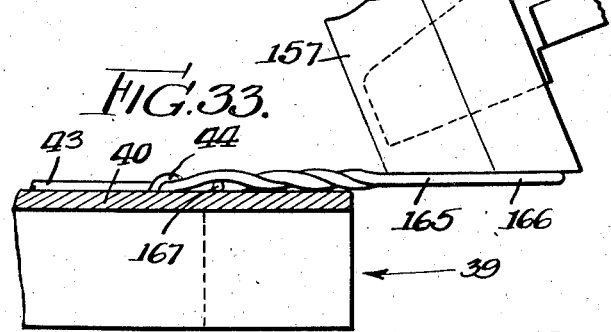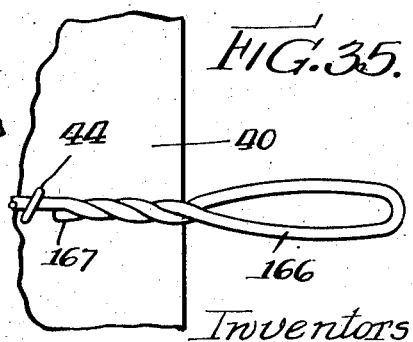

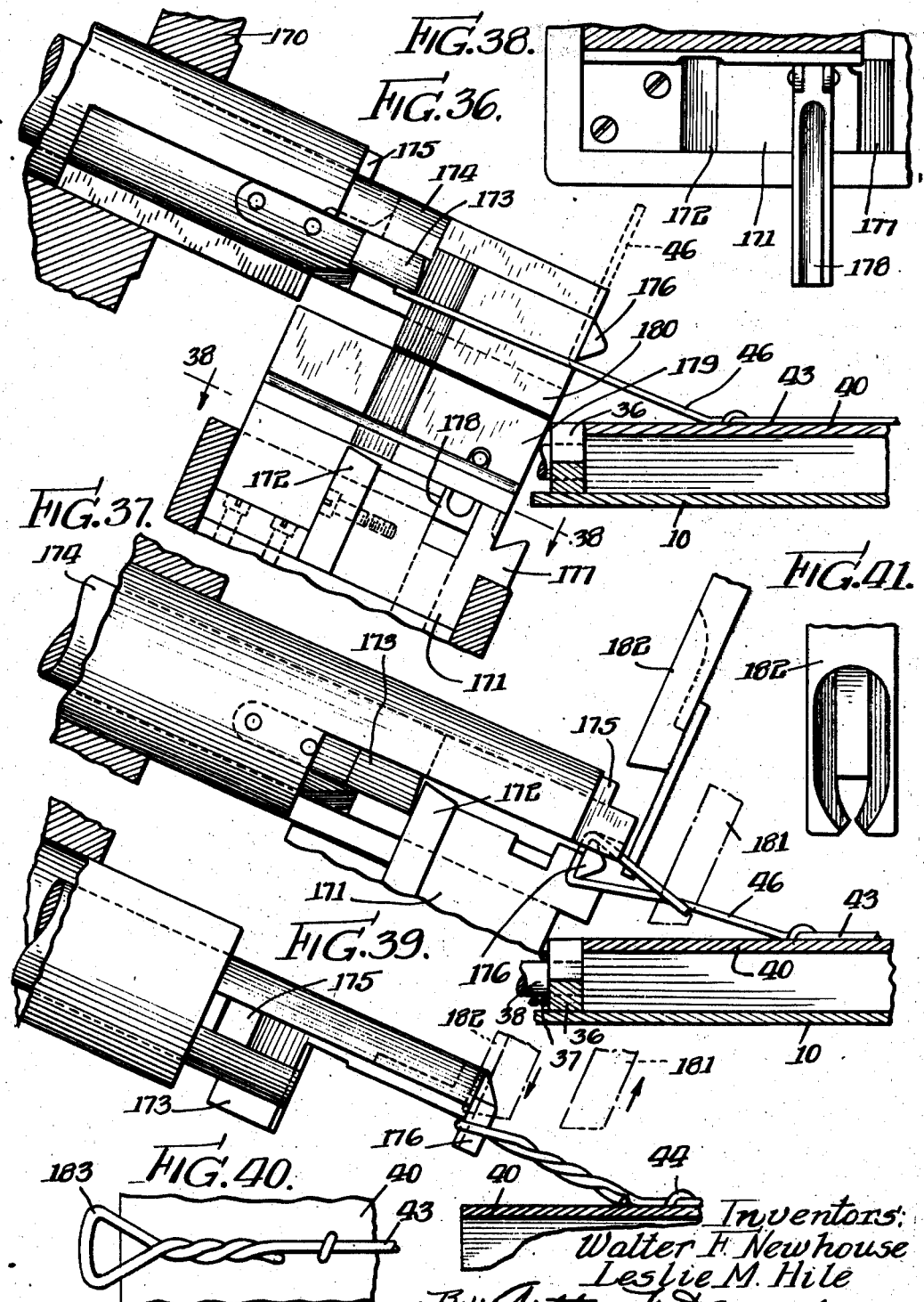

July 20, 1943.   W. F. NEWHOUSE ET AL   2,324,530
MACHINE FOR FORMING LOOPS ON THE ENDS OF
THE WIRES OF WIREBOUND BOXES
Filed Aug. 3, 1940    16 Sheets-Sheet 14
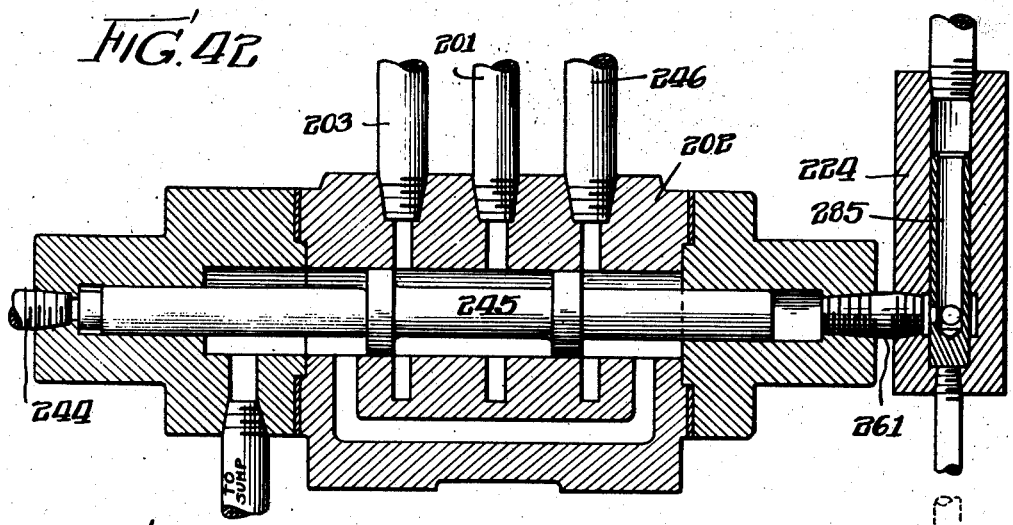
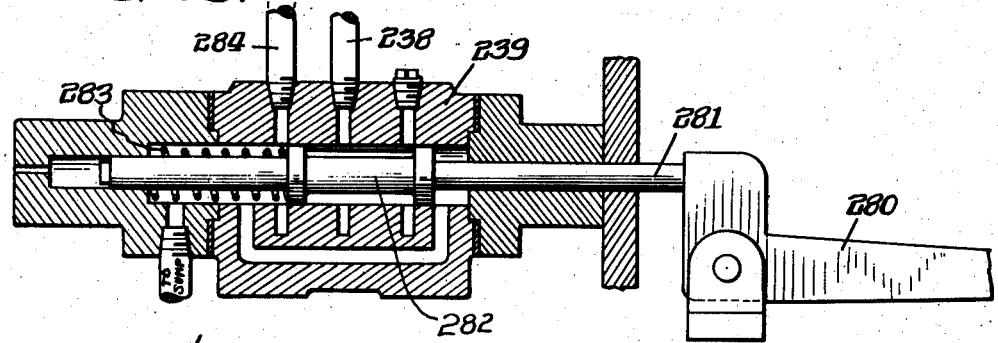
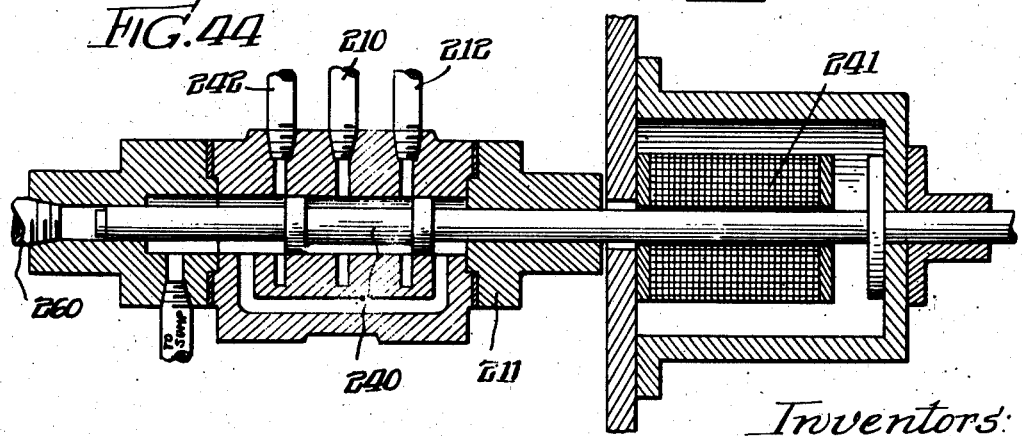
Inventors:
Walter F. Newhouse
Leslie M. Hile
By Arthur F. Durand, atty.

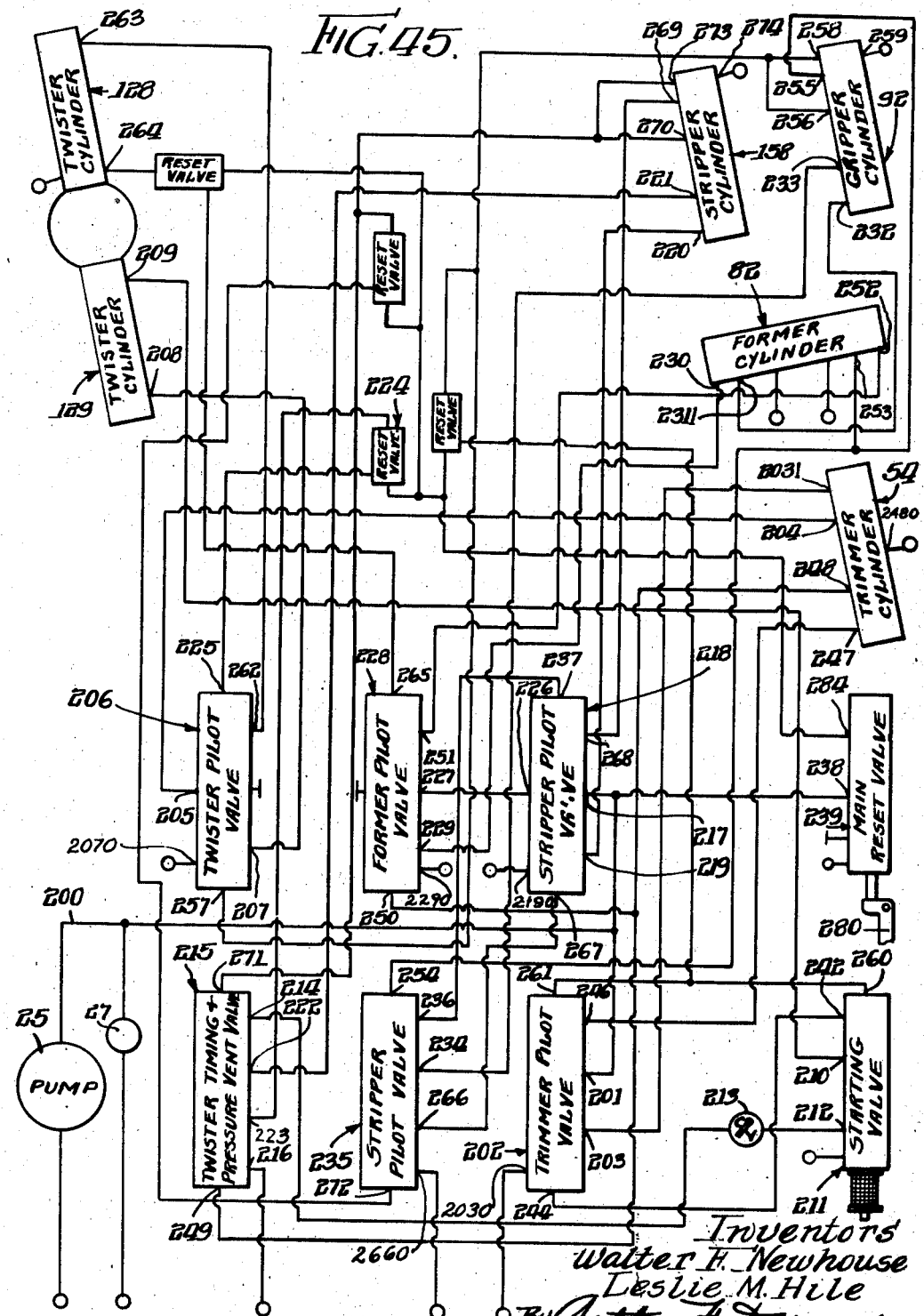

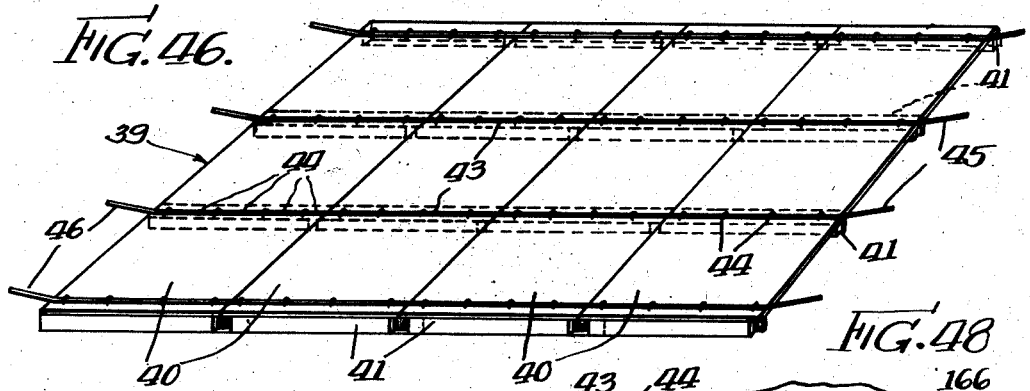
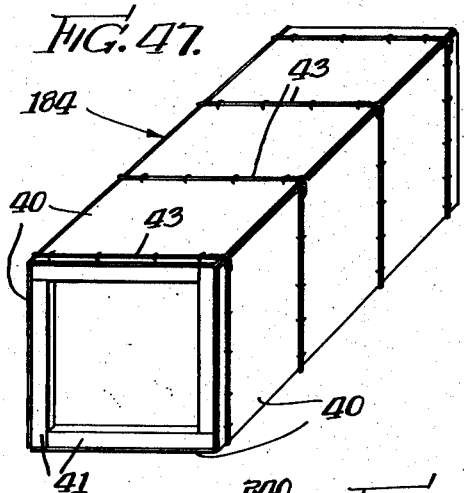
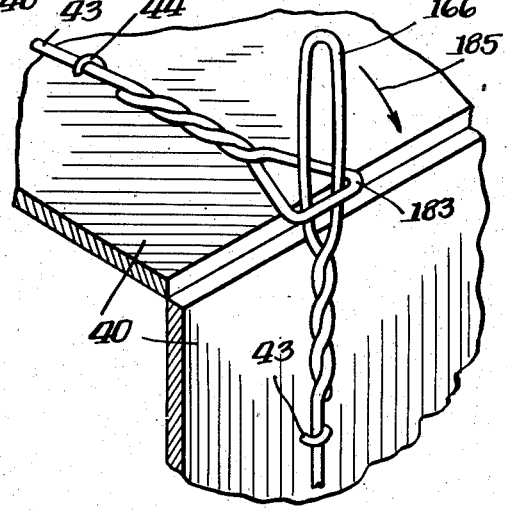
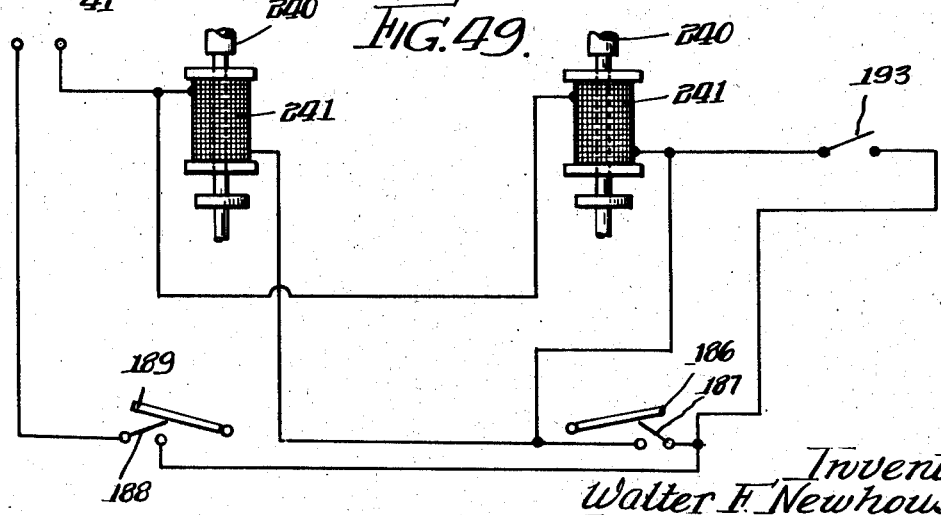

Patented July 20, 1943

2,324,530

UNITED STATES PATENT OFFICE 2,324,530

MACHINE FOR FORMING LOOPS ON THE ENDS OF THE WIRES OF WIRE-BOUND BOXES

Walter F. Newhouse and Leslie M. Hile, Benton Harbor, Mich., assignors to Saranac Patents Holding Company, Benton Harbor, Mich., a corporation of Michigan Application August 3, 1940, Serial No. 350,970

41 Claims. (Cl. 140—93)

This invention relates to machinery for forming loops on the ends of the binding wires of wirebound box or crate blanks.

Generally stated, the object of the invention is to provide a novel and improved construction and arrangement whereby a machine for this purpose is adapted to receive the box or crate blank, in any suitable or desired manner, as by placing the blank in the machine by hand, and is equipped with devices for then trimming the wire ends to the desired length, and thereafter bending and twisting the wire and thereby forming a loop on each end of each binding wire of the blank, so that one twisted loop at one end of the wire may be inter-engaged with the twisted loop at the other end of the same wire, when the finished box or crate is filled, thereby to hold the box or crate cover closed in such a manner that it can be opened by bending the wire and disengaging one loop from the other, should this be necessary or desirable, as for the purpose of inspection of the contents of the box or crate during the transportation thereof, as well as to make it easy and convenient to open the box or crate when it is finally desired to remove the contents thereof.

Another object is to provide an improved construction and arrangement whereby a machine of this kind is operated more or less hydraulically in a manner to insure against breakage of parts of the machine, in case some part of the blank or anything else should become jammed in any of the movable parts of the machine, and to insure other advantages as well.

It is also an object to provide certain details and features of construction and combinations tending to increase the general efficiency and desirability of a machine of this particular character.

To the foregoing and other useful ends, the invention consists in matters hereinafter set forth and claimed and shown in the accompanying drawings, in which—

Fig. 4 is a fragmentary view of the machine showing the wire trimmer cylinder in cross section.

Fig. 5 is a sectional view of the trimmer hydraulic cylinder as shown in Fig. 4, with the piston in a changed position.

Fig. 6 is a sectional view taken on the line 6—6 of Fig. 4.

Fig. 7 is a view similar to Fig. 6, showing the parts in a changed position.

Fig. 8 is a plan view of the trimmer block.

Fig. 9 is a perspective view of the loop bar used for making a long loop.

Fig. 10 is a perspective view of the former block used for making a long loop.

Fig. 11 is a fragmentary detailed view of a portion of the trimming and twisting mechanism.

Fig. 12 is a view similar to Fig. 11, showing the operating parts in changed position.

Fig. 13 is a plan view of a portion of the trimming and twisting mechanism.

Fig. 14 is a sectional view through the former hydraulic cylinder.

Fig. 15 is a sectional view of the former hydraulic cylinder shown in Fig. 14, with the piston in a forward position.

Fig. 16 is a section taken on the line 16—16 of Fig. 14.

Fig. 17 is a sectional view taken on the line 17—17 of Fig. 3, showing the twister hydraulic cylinder.

Fig. 18 is a view similar to Fig. 17, showing a changed position of the piston.

Fig. 19 is a section taken on the line 19—19 of Fig. 17.

Fig. 20 is a cross sectional view taken on the line 20—20 of Fig. 3, showing a gripper mechanism.

Fig. 21 is a view taken on the line 21—21 of Fig. 3.

Fig. 22 is a sectional view taken on the line 22—22 of Fig. 20.

Fig. 23 is a fragmentary perspective view showing the gripper holder slide and the clamping plates.

Fig. 24 is a view similar to Fig. 20, showing the gripper mechanism in a different position.

Fig. 25 is a cross sectional view of the gripper mechanism taken on the line 25—25 of Fig. 24.

Figs. 26 and 27 are vertical cross sectional views taken through the gripper hydraulic cylinder.

Figs. 28 and 29 are vertical cross sectional views taken through the stripper hydraulic cylinder.

Fig. 30 is a fragmentary perspective view showing the purpose of the wire guide plate.

Figs. 31, 32 and 33 are a series of views showing the different steps in the twisting and stripping of the wire.

Fig. 34 is a sectional view taken on the line 34—34 of Fig. 32.

Fig. 35 is a fragmentary view of the box blank with the completely twisted loop.

Figs. 36 and 37 are views of the wire twisting device for twisting a short loop.

Fig. 38 is a sectional view taken on the line 38—38 of Fig. 36.

Fig. 39 is a fragmentary view of the wire twisting device.

Fig. 40 is a fragmentary view of the box blank with the completed short loop.

Fig. 41 is a view of the lower portion of a wire stripping bar used for making the short loop.

Fig. 42 is a longitudinal sectional view of one of the hydraulic control valves and its connection with a reset valve used in the hydraulic control system.

Fig. 43 is a longitudinal sectional view of a hydraulic reset valve.

Fig. 44 is a longitudinal sectional view of a starting valve.

Fig. 45 is a diagrammatic view of the hydraulic system, the oil conduits being shown in single lines.

Fig. 46 is a perspective view of the box blank with the wires extending prior to being twisted.

Fig. 47 is a view of the box formed from the box blank.

Fig. 48 is a fragmentary perspective view showing a short twisted loop in association with a long twisted loop.

Fig. 49 is a diagram of an electrical wiring system as used for the dual control of the machine.

Figure 1:
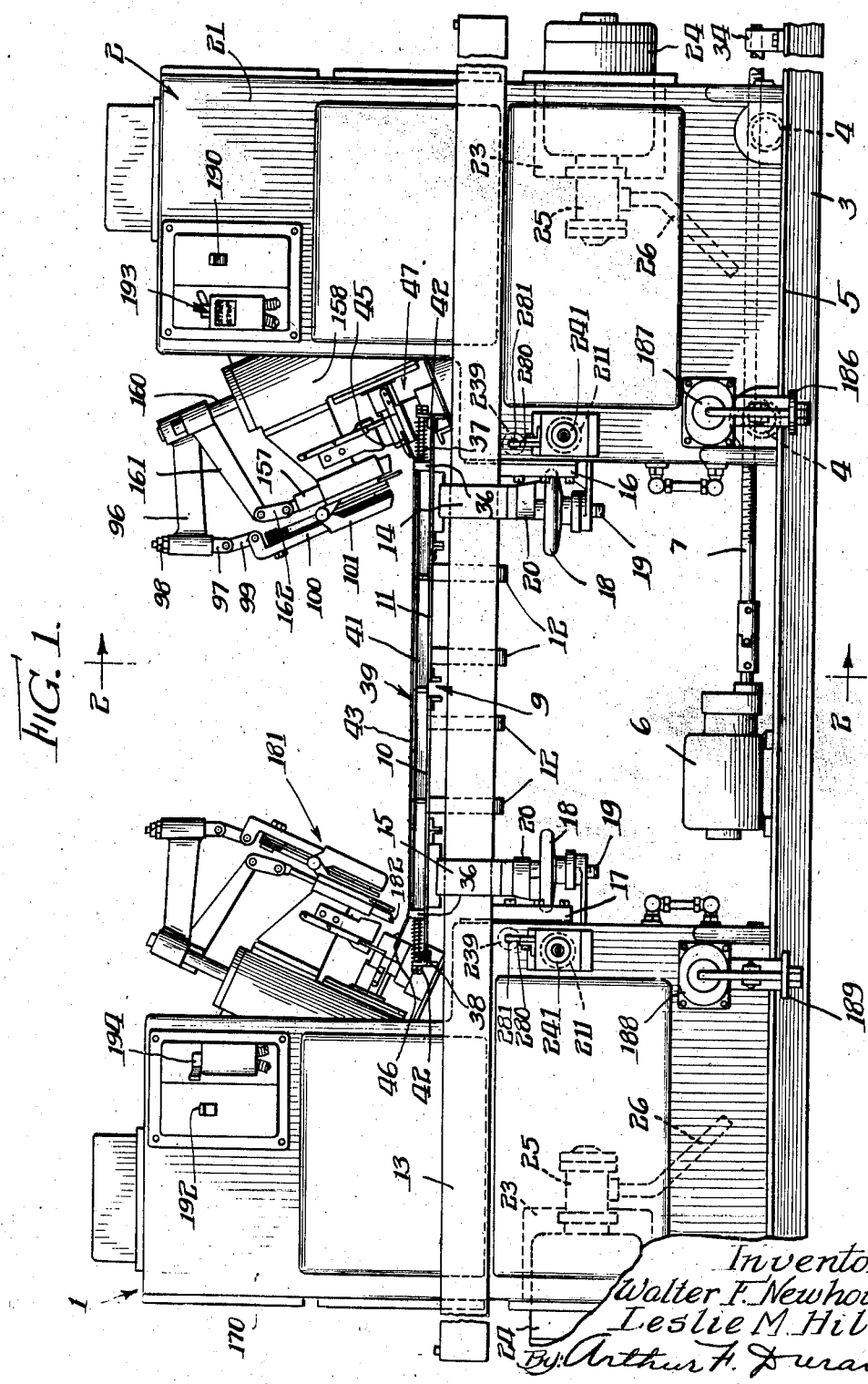
Fig. 1 is a front elevational view of a hydraulic wirebound twisting machine, embodying the principles of the invention.
Figure 2:
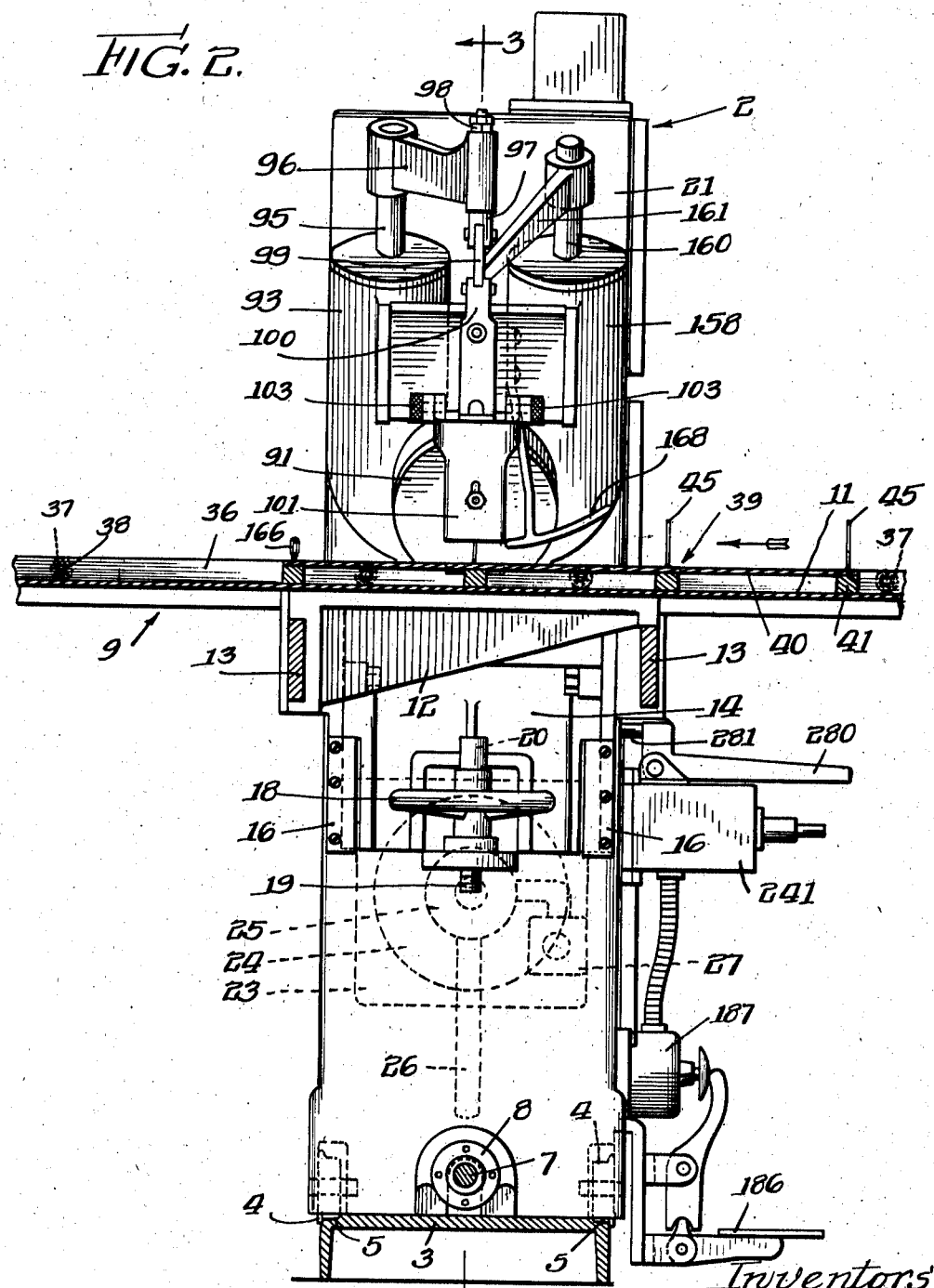
Fig. 2 is a vertical cross sectional view taken on the line 2—2 of Fig. 1.

As thus shown, referring to Fig. 1 of the drawings, the machine comprises a left-hand unit 1, and a right-hand unit 2, the left-hand unit being permanently fixed to the base 3, while the right-hand unit 2 is adapted to move longitudinally by means of a set of rollers 4, which engage a track 5 formed on the base support 3. An electric motor 6 is adapted to drive an elongated screw 7 which engages a nut 8 (see Fig. 2) attached to the bottom portion of the right-hand unit 2. Turning of the screw 7 by a motor 6, which has a reversible drive, will position the right-hand unit with respect to the left-hand unit. The spacing relationship between these two units is to accommodate different sizes of box blanks.

The box blank supporting table 9 comprises a left-hand member 10 and a right-hand member 11, supported by brackets 12, which are in turn supported on the longitudinal side bars 13. These side bars 13 are of a sufficient length to accommodate movement of the right-hand unit away from the left-hand unit when large size box blanks are being operated upon. The side bars 13 are in turn supported on adjustable table brackets 14 and 15 adapted to move in side vertical guides 16 and 17 (see Fig. 2) by means of a hand-wheel 18, which, upon rotation, lowers or raises the screw 19 which is journaled at 20 in the bracket 14, thereby imparting vertical movement to the side bars 13, and the blank supporting table. The supporting tables 10 and 11 attached to supporting bracket 14 are provided with end guide rails 36 which engage the edges and cleat ends of sides and tops of the box blank 39 to guide it into the machine and also to hold it from any side movement. The guide rails 36 are urged against the sides of the box blank 39 by springs 37. Studs 38, which are fixed in the guide rails 36 at spaced intervals, support the springs 37 and provide a means for adjusting the guide rails 36 by means of the adjusting nuts 42.

The right-hand unit 2 comprises a main housing or frame 21, having suitable removable cover plates to permit access to the inside mechanism of the machine. The bottom portion of the housing 21 comprises an oil reservoir or sump 22 for the oil that is used in the operation of the hydraulic controls (see Fig. 3).

A motor housing 23 is attached to the rear wall of the housing 21, thereby to provide a suitable semi-enclosure for an electric motor 24 adapted to operate an oil pump 25, which latter feeds oil to the hydraulic cylinders of one unit of the machine at a predetermined maximum operating pressure. The pump has an intake conduit 26 from the reservoir 22, the oil passing through the pump and through oil conduits to the hydraulic cylinders in the machine, as will hereinafter more fully appear.

A by-pass valve 27 is connected into the main oil line that comes from the discharge side of the pump 25 and goes to the hydraulic mechanism and is adjusted to automatically relieve an increase in pressure due to jamming of any part of the operating mechanism, or any other condition that would tend to increase the oil pressure above a certain degree. The oil would then by-pass through the valve 27 back into the reservoir 22 through the conduit 28, as indicated. The reservoir 22 is divided into two compartments by a partition 29, which permits the oil, that is being discharged from the machine, to settle out the foreign particles before it flows over the partition 29 into the part of the reservoir where the intake pipe 26 for the pump is located.

On the base of the right-hand unit 2, there is formed a bracket 30 provided with the nut 8, which engages the motor-driven screw 7, whereby the unit 2 is positioned relatively to the unit 1, as hereinbefore described. A roller 31, supported on a block 33, which is attached to the nut 8, engages the upper surface of the base support 3, which forms a track for the roller 31; the opposite end of the screw 7, being supported in the bracket 34, which together with the central support 33 forms a means for preventing sagging of the screw 7, due to its great length.

Referring to Fig. 46 of the drawings, there is shown a box blank 39 made up of four rectangular panels 40 and having spaced members 41, as shown. The panels 40 are held together by a series of transverse wires 43, which are attached to the box blank 39 by staples 44, in the well known manner. The wires 43 have ends 45 and 46 projecting from the edge of the box blank a sufficient distance to provide enough material to form a twisted lop. The amount of wire that projects is generally of greater length than will be necessary, and therefore it must be trimmed down to the proper or desired length. This operation is accomplished by the trimming mechanism 47, comprising a set of cutters 48 and 49 (see Figs. 4, 11, 12 and 13). The lower cutting blade 48 is attached to a trimming block 50 by means of screws 51, while the upper cutting blade 49 is attached to a twister shaft hereinafter more fully described. The trimming block 50 is connected by means of a pin 52 to the upper end of a piston 53 which is actuated in the hydraulic cylinder 54. A casting 55 provides a guideway for the trimming block 50 and is bolted to the main housing 21 as shown in Fig. 4. The casting 55 also provides a support for an aligner bracket 56 which is bolted thereto, as shown in Fig. 6. A vertical wall 57 of the bracket 56 provides a guideway for a secondary bracket 58, which latter is guided on pins 59 fixed in the base of the aligner bracket 56 and which have threaded ends to receive adjusting nuts 60, thereby providing an adjustable stop for the bracket 58, which is urged upward by the compression springs 61, in a manner that will be readily understood. The bracket 58 has an overhanging portion 62 which, in conjunction with the vertical wall 57 of the bracket 56, and the wall 63 of a loop bar or anvil 64, forms a substantially flat vertical surface. This surface forms a stop or positioning means for the wire as the operator feeds the wired box blank into the machine. If for any reason, when the wire box blank is being positioned in the machine, and the wire end 45 becomes tangled or jammed, the resiliency of the bracket 58 will allow the wire to pass between the upper surface of this bracket and the wall 63 of the loop bar 64 and then to be untangled and repositioned in the machine by the operator. The bracket 57 is provided with hinge connections 65 for a pair of wire holding arms 66, the purpose of which latter is to straighten out the ends of the wire by forcing them against the surfaces formed by the members 56, 58 and 63, and also to hold the wire in a straightened position while it is being trimmed. The arms 66 are actuated by cam surfaces 67 formed in the trimmer block 50, and when in a retracted or down position, the arms 66 rest on a vertical wall of the trimmer guide casting 55, previously described. A pair of spring-pressed plungers 68 are contained in a housing 69, which is attached to the bracket 56 by means of bolts 70. The plungers have projecting ends 71, which extend through the walls 57 and 58 to engage the arms 66 when they are in their upward position, as shown in Fig. 7. Upon retraction of the trimming block 50, the arms 66 are positively urged to return to the position as shown in Fig. 6, which is due to the force of the spring-pressed plungers 66 acting against them. The arms 66 will then be removed from this position when the twister and forming operation takes place. The upper cutting or trimming blade 49 has a projection 72 (see Fig. 11) which is so formed to fit into a longitudinal notch 73 formed in the twister shaft 74 and being fixed thereto by bolts 75. The loop bar or anvil 64 also seats in a longitudinal notch on the twister shaft 74, and is also held in position by the bolts 75.

After the wire is sheared by the knives, it is then bent to form a right angle by means of a forming block 76, which is fixed to the trimmer block 50 by means of a screw 77, as shown. The block 76 is provided with a forming groove 79 which contacts the wire as the block 76 is raised to bend the free end around the loop bar or anvil 64 to form a right angle, as shown in Fig. 11 of the drawings. When this action has been completed, the main portion of the wire is held firmly between the loop bar 64 and the forming block 76. A sleeve 80, which carries a forming die 81, is controlled by hydraulic cylinders 82 and 83 as shown in Figs. 14 and 15 and is moved toward the upstanding end of the wire 45 to form it around the end of the loop bar or anvil 64, as shown in Fig. 12. The forming die is held in position in the sleeve by means of spring-pressed pins 84. The forward end of the sleeve 80 has a cut-away portion 85 to provide a clearance for the trimming blade 48 and the trimming block 47 when they are in upward position. The rearward end of the sleeve 80 is formed with a flanged portion 86 which engages a notch 87 formed in the piston 88. This construction provides a means for connecting the piston 88 to the sleeve 80. The forming die 81 has a notch or groove 89 on its front and under surface to engage the wire to form it around the end of the loop bar or anvil 64, as shown in Fig. 12. The groove 89 also has its entering opening surfaces tapered as shown in Figs. 12 and 13, which will center the wire in the groove before it is formed into a U shape. A cam plate 90 (see Fig. 30), which is fixed to a stationary portion of the housing, forces the free end of the wire 45 as it is being bent to assume a position to the right of the portion of wire that is stapled to the box blank. A flanged casting 91 forms a bearing support for the sleeve 80 and also serves to provide in its lower portion the hydraulic cylinder 83 to control the retraction of the sleeve 80, which will hereinafter be more fully described. Prior to the retraction of the forming sleeve 80 with the forming die 81, a set of wire grippers (see Fig. 20) are lowered into a position to grip the main section of the wire 43, together with the free end of the wire 45, and hold them in this position while they are being twisted. The forming sleeve will then be retracted before the twisting operation begins. The wire gripper assembly is lowered by means of a hydraulic cylinder 92 (see Fig. 3) which is located in a housing 93 formed on the main housing 21. A piston 94 (see Fig. 26) operating in the cylinder 92 is provided with an extension 95 which projects upwardly to receive a collar of the arm 96 which has formed on its opposite end a short sleeve portion to receive an adjustable link 97 having threaded engagement with adjusting and locking nuts 98. The lower end of the link 97 is connected to another link 99, which in turn is connected to a gripper control slide 100 adapted to reciprocate in the gripper slide guide 101. A pair of outstanding projections 102, formed on the sides of the guide 101, are supported by pins 103, which forms a pivoted connection for the guide 101. The pins 103 are journaled on projections of the stripper bracket plate 104 which is attached to the bracket 105, which is in turn bolted to the cylindrical housing 93, previously mentioned. The gripper control slide 100 has pivotally attached to its upper surface by the pin 106 (see Fig. 20) a pair of gripper connector levers 107. The other ends of these levers are pivotally connected to the arms 108 and 109 of gripping members 110 and 111, which in turn are pivotally connected to a gripper holding slide 112 by means of the pivot pin 113 shown in the drawings. The levers 107 and the arms 108 and 109 of the gripper member 110 and 111 are bifurcated at their extremities to provide suitable connections, as shown in the drawings. The left-hand gripping member 110 is comprised of two sections, while the right-hand gripper member 111 comprises just the one section, as shown in Fig. 22. Each gripping member has formed on its lower end, wire gathering fingers 114. The left-hand member 110 has two fingers spaced apart to accommodate the single finger of the right-hand member 111 when they interlock to grip the wire in the slot 115 which is formed when the fingers move towards each other, as shown in Fig. 24. The gripper slide guide 101 has attached to its front surface, by means of bolts 116, a pair of clamping plates 117, provided with projections 118 on their lower end (see Fig. 23). These projections 118 form a limiting stop for the gripper holder slide 112 also adapted to slide in the gripper slide guide 101 and to cooperate with the gripper control slide 100. The lower end of the gripper holder slide 112, as seen in Fig. 23, has cut-away portions 120 to form abutments which engage the projection 118. The upper portion of the gripper holder slide 112 is provided with parallel bores 122 to receive a pair of compression springs 123 guided on rod 119 and journalled in the top portion of the gripper control slide 100, previously mentioned. A projection 124 is formed on the rear surface of the gripper holder slide 112, which engages a projection 125 formed on the front surface of the gripper control slide 100 (see Fig. 25). When the grippers are inactive, or when the fingers 114 are separated (see Fig. 20), the compression springs 123 force the slide 112 downwardly until the projection 124 abuts the projection 125. When the gripping action is to take place, the slide 100, which is guided in the gripper slide guide 101 and carrying with it the complete gripper assembly, is lowered until the gripper fingers assume a position relative to the wire, as shown in dotted lines in Fig. 20. Further downward movement of the slide 100 will cause the abutments 121 of the gripper holder slide 112 to engage the stationary projections 118 of the clamping plates 117, which will limit further movement of the gripper holder slide 112 in downward direction. The gripper control slide 100 continues to move downwardly, causing relative movement between these two members, and compress the springs 123. The wire gripping fingers 114 have their bottom surfaces 126 beveled as shown in Fig. 25, in order to permit them to assume a position closer to the surface of the box blank and therefore be more positive in the action of gathering up the wire. When the wire has been firmly gripped, the forming sleeve 80 and the forming die are retracted to a position as shown in Fig. 14. This rearward movement is produced by the hydraulic cylinder 83 moving the piston 88 which engages the flange 86 of the sleeve 80, previously described.

Figure 3:
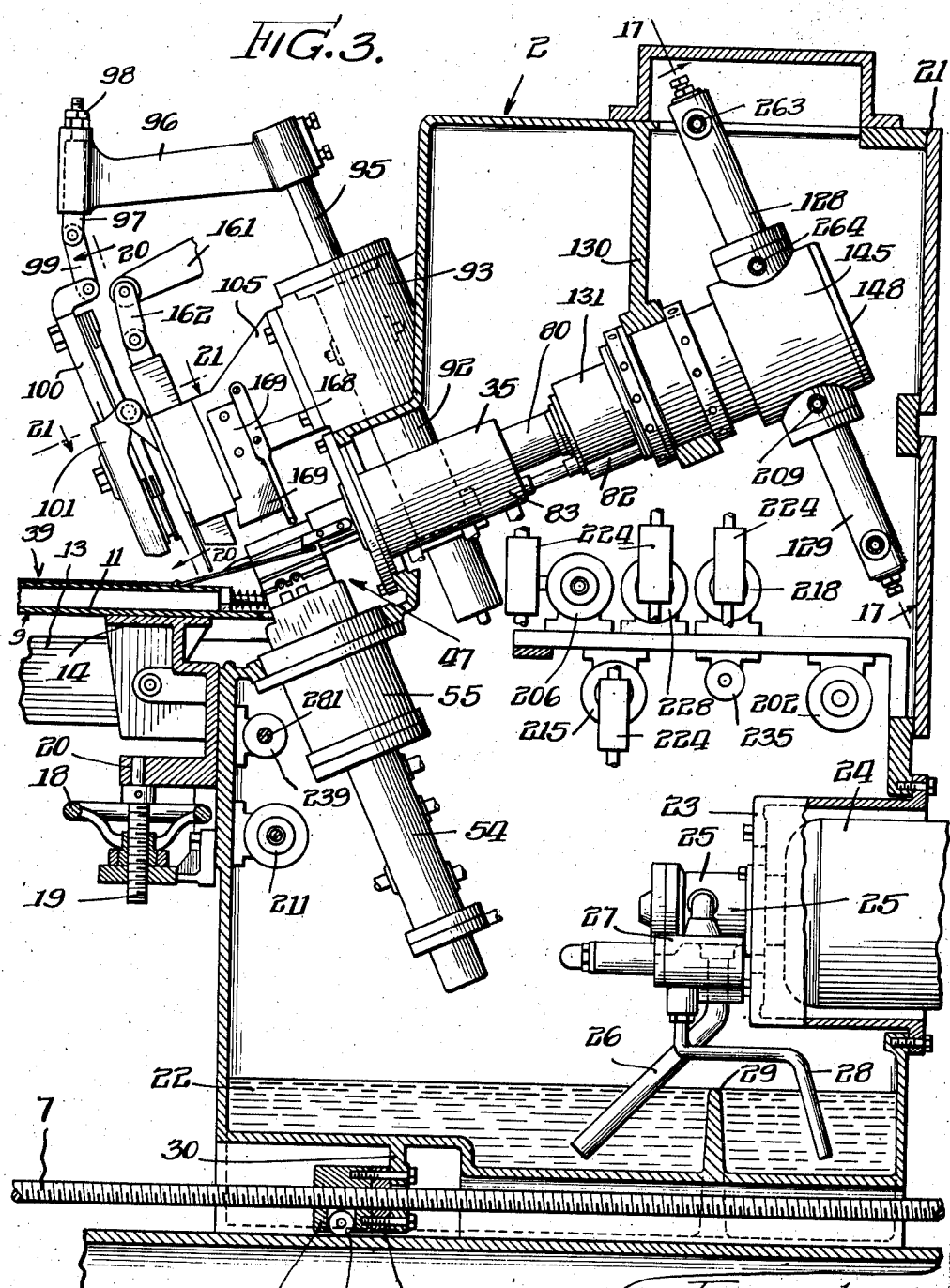
Fig. 3 is a vertical cross sectional view taken on the line 3—3 of Fig. 2.

The twisting of the wire is accomplished by the rotation of the loop bar or anvil 64, around which the wire is firmly held. The loop bar or anvil, being attached to the twister shaft as hereinbefore described, rotates with the twister shaft 74 and makes two and one-quarter turns to produce the required number of twists in the wire. Rotation of the twister shaft is accomplished by the action of a pair of hydraulic cylinders 128 and 129 mounted at right angles with respect to the twister shaft 74, as shown in Fig. 3 of the drawings. A bracket 130 provides a suitable support for the twister shaft bearing 131, which has formed in its lower portion the hydraulic cylinder 82, as hereinbefore described. This bearing 131 is provided with threaded portions 132 and 133 to receive collars 134 and 135, respectively, which provide locking means for the bearing 131 after it is adjusted to the correct position. The twister shaft 74 is held from longitudinal displacement by means of a flange 136 abutting the shoulder 137 on the bearing 131, previously mentioned. The opposite surface of the flange engages a ball-bearing raceway 138, which is held in position in the bearing housing 131 by threaded rings 139 and 140. Formed on the end of the twister shaft, is a pinion 141 engaging a rack bar 142, which is actuated by the pistons 143 and 144 in the hydraulic cylinders 128 and 129. A twister cylinder housing 145, supported by the bearing 131, forms a support for the hydraulic cylinders 128 and 129, and also provides a mounting for a pair of rollers 147, which support or back up the said rack 142. A cover plate 148 is bolted to the housing 145, as shown in Fig. 14, and provides a mounting for a pair of ball-bearing raceways 149, which form a bearing for the reduced end 150 of the twister shaft 74. A pair of adjustable stopping screws 151 are provided on opposite ends of each hydraulic cylinder 128 and 129 to adjustably limit the movement of the pistons 143 and 144 in the hydraulic cylinders. During the twisting operation, the twisted portion of the wire will tend to lessen in length, due to the amount of material that will be taken up by the twisting. This condition would, therefore, tend to cause the wire grippers, which are gripping the wire, to move toward the loop bar 64, which is being held from any longitudinal movement. In order to provide a flexible means, so that the wire gripper assembly will be able to approach the loop bar 64, a compression spring 152 is interposed between the gripper bracket plate 104, and the gripper slide guide 101. A bolt 153, fixed in the plate 104 and projecting through the slotted apertures 154 and 155, provide a support for the spring 152. A pair of nuts 156 provide adjustable means for limiting the rearward movement of the gripper slide guide 101, as shown in Fig. 25. Due to the pivoted support 103, the wire grippers will swing in an arcuate path, thereby to approach the loop bar 64 as the wires are being twisted. When the wire grippers are released from the wire, due to the upward movement of the gripper assembly, the compression spring 152 will automatically restore the gripper assembly to initial position, as shown in Fig. 25.

Upon completion of the twisting operation, the loop bar or anvil 64 assumes the position shown in Fig. 32, with the twisted loop of the wire held tightly in place. A stripper bar 157, guided in the bracket 105 and the plate 104, is actuated by a stripper cylinder 158, which is located in a portion formed on the main housing 21. The piston 159 has an extension 160, which projects upwardly to receive a collar on the arm 161. The opposite end of this arm 161 is pivotally connected to a link 162, which in turn is connected to the stripper bar 157 by the cross pin 163. Movement of the piston 159 will therefore transmit its motion to the stripper bar 157. A cutout portion 164 on the stripper bar 157 will enable it to straddle the loop bar or anvil 64 in its downward movement to disengage the wire from the bar by means of the under surface 165 pushing the wire loop free from the loop bar or anvil 64, as shown in Figs. 33, 34 and 35. The stripper bar then returns to its retracted position by means of the action of the hydraulic cylinder 158. The elongated loop 166 of the wire thus formed and twisted will then have the end 167 of the wire in a position underlying the twisted portion of the loop and in close proximity to the surface of the box blank.

A wire guide member 168 engages the wire ends 45 as they enter the machine to cam them downwardly so that they will be below the upper edge of the trimming knife 49. Side guiding plates 169 tend to keep the wire ends from side movement when they are being formed into a U shape.

Referring to Fig. 1 of the drawings, the position of the machine referred to as the left-hand unit 1 is substantially of the same construction as the right-hand unit 2, hereinbefore described, with the exceptions that the unit 1 is fixed to the base 3 and has no longitudinal movement. The housing 170 encloses similar operating mechanism as the housing 21 such as the hydraulic cylinders, valves, and conduits. The wire twisting mechanism will assume the same relative diagonal position with respect to the left-hand edge of the box blank as the corresponding portion of the opposite unit of the machine assumes to the right-hand edge of the box blank, this being due to the opposite diagonal construction or positioning of the wire forming members. The left-hand unit 1 is designed to produce a shorter loop in comparison with the longer loop produced in the right-hand unit of the machine. Therefore, necessary changes in construction, that are to produce this short loop, are shown in Figs. 36, 37, 38, 39, 40 and 41. A trimming block 171, having a trimming blade 172, which cooperates with the upper blade 173, is mounted on the twister shaft 174 to trim the wire to its proper length. A former die 175 moves outwardly to form the wire around the loop bar or anvil 176. A die block 177 moves upwardly with the trimming block 171 to cooperate with the loop bar or anvil 176 and the forming die 175 to form the wire end into a substantially triangular form, as shown in Fig. 37. A wire holding arm 178 permits the wire to be held against the flat surface formed by the vertical wall of an aligner bracket 179 and the flange 180 of the loop bar or anvil 176 as the wire is being trimmed. A wire gripper assembly 181 is lowered to grip the wire while it is in the process of being twisted. Upon the completion of this twisting operation, the wire is removed from the loop bar or anvil 176 by a stripper device 182, so constructed as shown in Fig. 41. The loop 183 thus formed (see Fig. 40) is relatively shorter, but wider than the loop formed by the right-hand unit of the machine, as shown in Fig. 35. The end of the wire assumes the same position with relation to the box blank as the end of the wire of the longer loop. The purpose of this difference in size and shape of the loop is apparent in Fig. 48 of the drawings, where the longer loop 166 is shown inserted into the shorter loop 183 to provide a connecting means for the opposite edges of the box blank when they are bound into engagement with each other to constitute the walls of a box 184, as shown in Fig. 47. After the loop 166 is inserted in the loop 183, it is bent in the direction of the indicating arrow 185. This connection will thereby provide a suitable means for holding the two loops in engagement with each other. The sequence of operation, and the actuating means for the left-hand unit, are identical with the operation of the right-hand unit, as hereinbefore described.

A dual control mechanism is provided for the operation of the machines, whereby the two operators cannot start either unit of the machine without the coordination of the other operator. The means for this arrangement comprises a foot pedal 186 which actuates an electric switch 187. A similar switch 188 is actuated by a foot pedal 189. Hand-operated switches 190 and 192 control the operation of the respective pump motors 24.

The left-hand unit 1 is provided with an electrical switch 194 to control the operation of the motor 6, which provides power means for moving the right-hand unit with respect to the left-hand unit, as shown in Fig. 1.

The hydraulic system, which is required to actuate and control the different operations of the machine, is shown in the diagrammatic view, Fig. 45, and comprises the hydraulic cylinders and also numerous valves which are standard equipment for hydraulic circuits, but which are adapted to perform special functions in this particular circuit. The construction of these different types of valves are shown in Figs. 42, 43 and 44.

Upon starting the electric motor 24, which operates the pump, a pressure is produced in the circuit and the flow of oil is from the pump 25 into a main fluid line 200 which connects to a port 201 of a trimmer pilot valve 202 (see Figs. 42 and 45). The oil then passes through this valve and out through the port 203 to the trimmer hydraulic cylinder port 2031. Passing through the cylinder 54, it passes out through the port 204 to enter a port 205 on the twisting pilot valve 206, and then out through a port 207 to the port 208 on the twisting cylinder 129. The fluid then passes through the hydraulic cylinder 129 and out through the port 209 to the starting port 210 of a starting valve 211. Passing out the port 212 and through the check valve 213, the oil then enters a port 214 on a twister timing and pressure vent valve 215, which is similar in construction to the trimming valve 202, and then out the port 216 to the oil reservoir thus retaining the wire loop twisting instrumentalities in their normal inoperative position through the arrangement of valves and conduit connections hereinafter described. The main pressure line 200 also goes to a port 217 on a stripper pilot valve 218. The oil, after flowing through the valve 218, passes out of a port 219 to a port 220 on the stripper hydraulic cylinder 158. Passing through the cylinder, the oil then passes out of a port 221 to a port 222 on the valve 215. The oil then flows through the valves 215, and out a port 213 through a reset valve 224, and then to a port 225 on the valve 206. This main line also goes through the valve 218 and out of the port 226 and then to a port 227 on a former pilot valve 228. Passing through the valve 228, it flows out of a port 229 to another port 230 on the former cylinder 83. After passing through the cylinder 83, it flows out of the port 231 to a port 232 on the hydraulic cylinder 92, where it passes through the cylinder 92 and then out of the port 233 to a port 234 on a stripper pilot valve 235, and then through the valve 235 and out the port 236 to a port 237 of the valve 218. The main line 200 also goes to a port 238 on the main reset valve 239. Through these connections, a predetermined fluid pressure is maintained in the valves and hydraulic cylinders, due to the operation of the motor-driven pump 25, previously described. A starting valve 211, having a piston 240, is shifted by the solenoid 241 thereby connecting 210 and 242 which closes the hydraulic circuit and maintains predetermined working pressure. Thus, at such time there will be no flowing through port 212, check valve 213 and ports 214 and 216 in twisting, timing and pressure valve 215, which permits the fluid to pass out of the port 242 to the port 244 to shift the piston 245 in the valve 202 and thereby disconnect ports 201 and 203 and connect the port 201 with the outlet port 246 which connects to a port 247 of the trimmer hydraulic cylinder 54, thereby actuating the piston 53 to perform the trimming operation. The shifting of the piston 202 in the valve 246 also connects ports 203 and 2030 so that in the trimming operation the oil will be forced out of the upper end of the trimming cylinder 54 through the ports 203 and 2030 in trimmer pilot valve 202 to reservoir. After the completion of the trimming operation the oil then passes out of the port 248 to a port 249 on the twister timing and pressure vent valve 215, and also passes to the port 250 of the former pilot valve 228, to shift the former pilot valve piston. This movement of the piston disconnects ports 227 and 229, connects the port 229 with the port 2290 and connects ports 227 and 251, which in turn connects with a port 252 of the former cylinder 82, to shift the piston 88 to perform the forming operation, which exhausts the fluid out through port 230 of cylinder 83 and through ports 229 and 2290 of the former pilot valve 228 to reservoir. After the completion of the forming operation the oil will then pass to an outlet port 253, which connects to a port 254 on the stripper pilot valve 235 to shift the valve piston, thereby connecting ports 234 and 266 and also ports 236 and 2660, thereby disconnecting ports 236 and 234. The port 253 also connects to a port 255 on the gripper cylinder 92 to shift the piston to perform the gripping operation. The fluid exhausts from cylinder 92, see Figure 27, through port 232 and port 231 around piston 88 to sump, see Figure 15. The completion of the gripping operation allows the oil to pass out of of a port 256 to a port 257 on the twister pilot valve 206 to shift the valve piston. This fluid line also connects to a port 258 on the cylinder 92 where it is sealed from returning to reservoir by stem 95 of piston 94, see Figure 27. The oil conduit from the port 256 to the port 257 also connects, through a reset valve, to port 260 of start valve 211 to return the valve piston 240 to its initial position and to port 261 on the trimmer pilot valve 202, which shifts the valve piston 245, connecting ports 201 and 203 to cause the return of the trimmer piston 53. As soon as the trimmer piston 53 has returned, then ports 2031 and 204 are connected to permit passage of fluild to port 205 of the twister pilot valve 206 which, when the oil enters the port 257, permits the port 205 to connect with the port 262, which in turn connects to port 263 of a twister cylinder 128. Shifting of the piston 144 to perform the twisting operation causes the forcing of oil out of the twisting cylinder 129 through port 208 and through twister pilot valve 206 through ports 207 and 2070 to reservoir. Upon the completion of this shifting of the piston 144 the oil passes out the port 264 to enter the port 265, which sets the former pilot valve 228 for the returning of the former piston 88. When the former pilot valve 228 is set, the oil eners the port 227 from the main line 200, and then passes out the port 229 to a port 230 in the former cylinder 82 to retract the former piston 88, forcing the fluid out of cylinder 82 by way of port 252 and former pilot valve ports 251 and 2290 to reservoir. When the former piston 88 has been retracted the oil then passes out the port 231 to a port 232 on the gripper cylinder 92 to shift the piston 94. The fluid from cylinder 92 exhausts through port 255 and cylinder 82 through port 253 to sump, thereby releasing the twisted wire from the gripper. After the wire has been released the oil then passes out the port 233 to a port 234 on the stripper pilot valve 235, and then out the port 266, which connects to a port 267 on the stripper valve 218 to shift the stripper valve piston, connecting ports 217 and 268, and also connecting ports 219 and 2190. When the stripper valve piston is shifted, oil exhausts from port 237 through stripper valve 235 and ports 236 and 2660 to reservoir.

The fluid from the main line 200, which enters the port 217, will then pass out the port 268 to the port 269 on the stripper cylinder 158 to shift the stripper piston 159 and perform the stripping operation, expelling oil from cylinder 158 by way of port 220 and stripper pilot valve 218 and ports 219 and 2190 to reservoir. Upon completion of the stripping operation, the oil then passes out the port 270 to a port 271 on the twister timing valve 215 to shift the valve piston. The fluid exhausts through port 249 and trimmer cylinder 54 and ports 248 and 2480 to sump. After the piston in the twister timing and pressure vent valve has completed its shift, the pressure rises in the line between ports 270 and 271. The resulting pressure rise is transmitted to port 272 in stripper pilot valve 235 and causes a shift of the valve stem to connect port 234 with port 236 and to connect port 266 with port 2660. Fluid may now pass from port 234 through valve 235 and port 236 into port 237 in stripper pilot valve 218 causing a shift of the valve stem to connect port 217 with port 219 and port 268 with port 2190. Fluid is now transmitted from pipe 200 into port 217, through stripper pilot valve 218, out port 219 into port 220 of stripper cylinder 158 to return the stripper piston 159 to starting position. The exhaust fluid from stripper piston 159 to starting position. The exhaust fluid from stripper cylinder 158 is dispelled through port 269 into port 268, through stripper pilot valve 218, and out port 2190 to the reservoir. When the stripper piston 159 has returned to its starting position fluid entering the stripper cylinder 158 at port 220 passes through port 221 into port 222 of the twister timer and pressure vent valve 215, out port 223 to a port 225 on the valve 206 forcing oil through port 257 and ports 258 and 259 in cylinder 92 to reservoir to set twister pilot valve 206 for actuating the twister piston 143 to return the twister to a starting position. With this setting of the twister valve 206, the oil from the main line passes through ports 201 and 203 in the valve 202 and enters the port 2031 of trimmer cylinder 54 and then passes out of the port 204 to the port 205 of the valve 206, and then out through the port 207 to the port 208 on the twister cylinder 129. After the twister piston 143 has returned to its starting position the oil passes out of the port 209 to the port 210 on the starting valve 211, where it then passes through and flows out of the port 212 through the check valve 213 to the port 214 on the twister valve 215, and then out the port 216 to the oil reservoir. This opens the circuit for the repetition of the operation. The valves and cylinders are provided with the necessary drains to the oil reservoir, as indicated in the drawings. The main reset valve 239 is operated manually by a lever 280 through a rod 281, which actuates a piston 282 which is held in a forward position by a spring 283. When the piston moves to the left, as shown in Fig. 43, the port 238 connects with the port 284 which thereby allows fluid from the main line to pass through the valve 239 and then through all of the reset valves 224 to shift the piston 285, and thereby allows fluid to pass through the ports 261, 272, 225 and 265, and thereby resets the valve pistons to their starting position. This manual operation for resetting is necessary, due to the fact that the machine may become jammed during its operation and, therefore, must be reset to its starting position before another cycle of operations can take place. When the fluid under pressure is applied to one end of a cylinder or valve, the fluid under pressure in the opposite end of the cylinder is released so that the piston may be operated.

When the two units of the machine are adjusted to the proper spacing to accommodate the size of the box blank to be used, the operators will then start the motors 24 to put fluid pressure into the system. The box blank is then put into the machine with the outstanding ends of the wires straightened or conditioned, if necessary, by the operator. If the operator of the unit 1 is ready to operate his unit of the machine, he depresses the foot pedal 189, which partially closes the electrical control circuit, but this action will not operate his unit. When the operator of the unit 2 is ready, he will depress his foot pedal 186 and thereby complete the electrical circuit, which energizes the solenoids 241 to operate the pistons 240 of the starting valves 211. By this dual control arrangement, neither operator can operate his unit until the other operator is ready. If the box blank is relatively small so that the two units of the machine are quite close together, only one operator is necessary to operate both units. This is accomplished by closing a switch 193, which will permit the operation of the two units by depressing the foot pedal 189, which will thereby close the electrical circuit. Each unit may be operated for testing purposes by manually shifting the horizontally extending rod of the piston 240. When the twisting of the ends of the first wire on the leading edge of the box blank has been completed, the operators will move the box blank forward into the machine a distance equal to the space between the stapled wires. The two units of the machine are then again operated to twist the second wire and this step-by-step movement is continued until the complete series of wires on the box blank have been formed and twisted.

Thus, it will be seen that the end portion of the wire is first cut or trimmed to the proper length, as indicated in Figs. 4 and 36 of the drawings. After that, the end portion of the wire is bent up, as shown in Figs. 11 and 36 of said drawings. After that, the end portion is bent to form a hairpin-shaped loop, as indicated in Figs. 12 and 37 of the drawings. Thereafter, there is a gripping action on the wire, to hold it in position, as illustrated in Figs. 20 and 24 of the drawings. While these grippers are in action, the wire is twisted to form the two-strand twist, as shown in Fig. 31 of the drawings. Following that, there is a release of the grippers, as indicated in Fig. 32 of the drawings. And, finally, the wire is stripped from the form, to release the loop therefrom, as shown in Figs. 32 and 33 of the drawings.

The switch 190 simply controls the starting and stopping of the motorized pump 25 at the right hand end of the machine, and, in a similar manner, the switch 192 controls the starting and stopping of the motorized pump 25 at the left-hand end of the machine, shown in Fig. 1 of the drawings. Also, the switch 194 is for merely starting and stopping the motor 6 that operates the screw 7 by which the right-hand unit, shown in Fig. 1, is moved toward and away from the left-hand unit shown in this figure of the drawings. As indicated in Fig. 49 of the drawings, the switch 193, when closed, enables the operator standing in front of the left-hand unit to control the operations of both units simultaneously. With two operators, when the pedal switch 188 and 189 is closed, nothing happens until the other pedal switch 186 and 187 is closed by the other operator, for with the switch 193 open, neither unit can operate until both of the pedal switches are closed.

Desirably, as indicated in the drawings, the wirebound box blank is positioned flatwise in the machine, and is fed forward in the plane thereof, with one side edge of the blank leading, and the other side edge following, which means that one set or line of cleats is ahead, while the other set or line of cleats is behind, these cleats being parallel with the longitudinal binding wires of the blank. In this way, the several binding wires of the blank are successively engaged by the two forming units, the latter operating first on the opposite ends of the wire at the leading edge of the blank, then simultaneously on the next wire, until all of the wires are provided with loops of the kind shown and described at the opposite ends of each wire. As indicated, the mechanism of each unit operates accurately to position the extreme end of the wire in engagement with the top of the blank and under the twist, as indicated in Figs. 33 and 39 of the drawings, so that this sharp end, formed by cutting off or trimming the wire, is disposed of in such a manner that it can do no harm to the hands of the workers who handle boxes of this kind.

Looking at Fig. 45, it will be understood that this is a diagram of the hydraulic system for the right-hand loop-forming unit shown in Fig. 1 of the drawings, and that a diagram of the hydraulic system for the left-hand loop-forming unit would be the same, except that it would be turned over from right to left. Preferably, the two loop-forming units are inclined toward each other at such an angle that the end portions of the wire are required to be bent upwardly at right angles to the angle of inclination of each unit. It will be seen that the right-hand unit, shown in Fig. 1, makes the relatively long and narrow loops for one end of the blank, and that the left-hand loop-forming unit shown in this figure of the drawings makes the relatively short and wide loops for the other end of the blank.

It will be seen that the box blanks enter the machine shown and described exactly as they come from the machine for making the blanks, ordinarily, for unless the wire ends are very much out of place or bent around, they do not have to be conditioned by hand before the blank is placed in the machine for forming the loops. Thus the machine not only conditions the wire ends, by putting them into position, but also trims the wire ends to the proper length after the blank is in the machine.

It will be seen, therefore, that the flattened out wire bound box blank is moved edgewise in a horizontal plane, in a direction transverse of the binding wires, and that as a consequence successive operations are performed at the opposite ends of the blank. As shown and described, these successive operations consist in forming and twisting loops on the wires, but it is obvious that successive operations of one kind or another would be within the specific concept of the invention. While, as shown and described, the blank is stationary when the loops are formed on the ends of the wires, it is obvious that in a modified structure the loop forming devices might be operated to form loops while the blank is traveling along. In other words, as shown and described, the blank has what may be called intermittent feed, and while this feeding is done by hand, it is obvious that blank feeding means of one kind or another operated by power could be used for feeding the blanks in any suitable or desired manner. Thus, loops are formed on the opposite ends of the wire at the same time, the two loops of the wire being formed simultaneously. It is understood that wire bound box blanks some time have two or three or four or more wires and it is obvious that in that case the loop forming devices would be of suitable number to do the work.

It will be seen that the anvil 64 is tapered toward the blank, at its front edge, and that it has a round rear edge that forms the bight of the loop in the wire. This is shown very clearly by many of the drawings, especially those including Figs. 31 to 35 of the drawings. Then, at the other end of the blank, there is the anvil 176, which must produce a different form of loop, and for that purpose this anvil is longer than it is wide, longitudinally of the machine, so that it has practically a flat back and a tapered front, as shown very clearly in Fig. 37 of the drawings.

It will also be seen by reference to the drawings that the loop bars or anvils 64 and 176 are mounted for rotation about a fixed axis which is inclined to the horizontal plane of the blank, and as shown in Figs. 11, 12, and 30 to 39, the tapered edges of the anvils extend substantially horizontal when the wire is wrapped around the anvils but extend more or less vertically in an inclined plane when the loop is stripped from the anvils.

What we claim as our invention is:

1. In a machine for forming loops on the ends of the wires of a wirebound box blank, the combination of means to trim the wire to the proper length, to bend the wire into an upstanding position, to bend the wire into hairpin loop form, for gripping said loop, for twisting the two sides of the loop together, leaving a closed loop at the outer end thereof, for releasing the gripping means, and for stripping the loop from the twisting means, leaving the loop projecting from the end of the blank and then repeating these operations on the next wire of the same blank in combination with means for supporting the blank in a stationary position during each of the said successive operations on the end portions of the binding wires.

2. A structure as specified in claim 1, in which the wire ends at each end of the blank are necessarily operated upon successively, said stripping means being operative to press the loop down upon the blank parallel with the plane of the latter, with the end of the wire against the blank and underneath the twist.

3. A structure as specified in claim 1, in which the wire ends at each end of the blank are necessarily operated upon successively, all of said means, except the stripping means, being embodied in a mechanism extending horizontally and downwardly toward the end of the blank, requiring that the end portion of the wire be bent upwardly at the same angle, before the operation of said mechanism on the wire.

4. A structure as specified in claim 1, in which the wire ends at each end of the blank are necessarily operated upon successively, all of said means, except the stripping means, being embodied in a mechanism extending horizontally and downwardly toward the end of the blank, requiring that the end portion of the wire be bent upwardly at the same angle, before the operation of said mechanism on the wire, said mechanism having both rotary and reciprocating motion, and said stripping means being disposed to operate at right angles to said angle of the mechanism.

5. A structure as specified in claim 1, in which the wire ends at each end of the blank are necessarily operated upon successively, all of said means, except the stripping means, being embodied in a mechanism extending horizontally and downwardly toward the end of the blank, and said stripping means being disposed in a position to operate at right angles to said angle of the mechanism.

6. A structure as specified in claim 1, comprising hydraulically controlled and operated instrumentalities for operating said means to cause the said successive operations on the wire to occur in the proper sequence thereof.

7. A structure as specified in claim 1, in which the wire ends at each end of the blank are necessarily operated upon successively, comprising power-driven instrumentalities for causing the actuation of said means in the proper sequence thereof.

8. A structure as specified in claim 1, in which the wire ends at each end of the blank are necessarily operated upon successively, all of said means, except the stripping means, being embodied in a mechanism operative for forming at one end of the wire a relatively long and narrow loop, adapted for insertion through a wider loop on the other end of the same wire.

9. A structure as specified in claim 1, in which the wire ends at each end of the blank are necessarily operated upon successively, all of said means, except said stripping means, being embodied in a mechanism adapted to form at one end of the wire a relatively wide and short loop, adapted to receive a longer and narrower loop on the other end of the same wire.

10. A structure as specified in claim 1, all of said means being embodied in a unit disposed at one end of the blank, when the latter is horizontally disposed in the machine, and similar means embodied in a similar unit disposed at the other end of the blank, together with controlling instrumentalities for coordinating said units for simultaneous operation on the opposite ends of the same wire, together with guiding means whereby the blank may be moved in the plane thereof to bring the two or more wires of the blank successively into position to have their end portions operated upon by said units.

11. A structure as specified in claim 1, comprising hydraulic cylinders having hydraulically operated pistons for operating all of said means, having automatic valves to cause the said pistons to operate in the desired sequence of the said operations on the wire, a motorized pump for supplying liquid to said cylinders, and means for starting and stopping said pump at will.

12. In a machine for forming loops on the ends of the wires of a wirebound box blank, the combination of a support for the blank, upon which the latter is movable flatwise in the plane thereof, with one side edge of the blank leading, and the other side edge following, a loop-forming unit at each end of the blank, so that the opposite ends of each binding wire may be operated upon simultaneously, power means for operating said units, and means for starting and stopping the operation of each unit at will.

13. A structure as specified in claim 12, said units being inclined toward each other, thereby requiring that the end portions of the wire be bent upwardly to extend at right angles to the angle of inclination of each unit.

14. A structure as specified in claim 12, one of said units being movable toward and away from the other unit, for blanks of different lengths.

15. A structure as specified in claim 12, one of said units being movable toward and away from the other unit, for blanks of different lengths, in combination with a motor controllable at will and screw-connected with said movable unit to move the latter toward and away from the other unit.

16. A structure as specified in claim 12, comprising yielding means for engaging the opposite ends of the blank to properly position the latter, movable in the plane of the latter.

17. A structure as specified in claim 12, said power means comprising hydraulic cylinders having hydraulically operated pistons therein, and automatic valve means for causing said pistons to operate in the desired sequence of the operations performed by said units on the end portion of each wire, together with a motorized pump for each unit, for supplying liquid to each cylinder under the automatic control of said valves.

18. A structure as specified in claim 12, said power means comprising hydraulic cylinders having hydraulically operated pistons therein, and automatic valve means for causing said pistons to operate in the desired sequence of the operations performed by said units on the end portion of each wire, together with a motorized pump for each unit, for supplying liquid to each cylinder under the automatic control of said valves, in combination with a separate starting switch for the motor of each pump, and an electromagnetically operated starting valve for the hydraulic operating means of each unit, together with energizing circuits for said electromagnetically operated valves controlled by a pedal switch for each unit, for preventing the operation of either unit alone, to insure only simultaneous operation of the two units, under the control of two operators, and another switch in the circuit for permitting simultaneous control of both units by only one operator.

19. A structure as specified in claim 12, in combination with a separate motorized hydraulic operating means for each unit, and separate electrical control means for the hydraulic means of each unit.

20. A structure as specified in claim 12, in combination with a separate motorized hydraulic operating means for each unit, and separate electrical control means for the hydraulic means of each unit, together with means interconnecting said control means to enable one operator to control the starting and stopping of both units, and to prevent operation of either unit alone when two operators are running the machine.

21. A structure as specified in claim 12, having hydraulic means for operating said units, and a safety valve device for releasing liquid from the hydraulic system, to prevent breakage of any portion of the machine in case of anything becoming jammed therein.

22. In a machine for twisting loops on the ends of the binding wires of a wirebound box blank, the combination, in said machine, of means for receiving the blank in the condition in which it left the machine for making the blanks, adapted to condition the wire ends for the operation of the machine thereon, mechanism for thereafter trimming the wire ends to the desired length, and mechanism for thereafter bending and twisting the wire to form loops on the opposite ends of each binding wire.

23. In a machine for performing successive operations on the opposite ends of a wire bound box blank, the combination of guide means for supporting the blank spread out flatwise for guiding the blank in a direction transverse of the binding wires thereof, devices supported and relatively arranged to perform said operations on the opposite ends of the blank, so that each end of the blank is operated upon a plurality of times successively and power transmitting means for actuating said devices.

24. A structure as specified in claim 23, said devices being actuated in unison so that they all operate simultaneously.

25. A structure as specified in claim 23, said devices having means to form loops on the ends of said wires.

26. A structure as specified in claim 23, said devices being operated while the blank is stationary.

27. A structure as specified in claim 23, each of said devices comprising a looper and a twister disposed at right angles to each other, respectively, to form and twist a loop on the end of the wire.

28. A structure as specified in claim 23, said devices having hydraulic operating means for the actuation thereof.

29. In a machine for forming loops on the ends of the wires of a wirebound box blank, a plurality of devices disposed in operative position at opposite ends of the blank, and power transmitting means to simultaneously operate said devices to simultaneously form loops on the opposite ends of the same wire, together with guiding means for the blanks to enable said devices to operate on the parallel wires succesively, so that the same devices operate on each wire.

30. A structure as specified in claim 29, there being a plurality of said devices for each end of the blank.

31. A structure as specified in claim 29, comprising means to adjust said devices into different positions for blanks of different lengths.

32. In a machine for the purpose specified, a relatively flat rotary anvil having its longitudinal axis inclined with respect to a substantially horizontally supported blank and mounted to rotate about a fixed axis inclined to the horizontal plane of the blank, means for wrapping the end portion of the wire about said anvil, means for then twisting the wire to form a loop, and means for stripping the loop from said anvil.

33. A structure as specified in claim 32, said anvil comprising a flat plate having a tapered edge extending toward the blank and being adapted to operate so that said edge is substantially horizontal when the wire is wrapped around the anvil, and said edge extends more or less vertically in an inclined plane when the loop is stripped from the anvil.

34. A structure as specified in claim 32, said anvil having a rounded rear edge to form the bight of the loop.

35. In a machine for the purpose specified, the combination of a rotary anvil mounted to rotate about a fixed axis inclined to the horizontal plane of the blank, means for wrapping the end portion of the wire about said anvil, means for then twisting the wire to form a loop, means for stripping the loop from said anvil, and means for trimming the wire to proper length before wrapping it around the anvil.

36. A machine for forming loops on the ends of wires of a wirebound box blank comprising means for supporting a box blank having a projecting end of wire, an anvil, first and second movable means operating substantially at right angles to each other for bending said wire end about said anvil, and hydraulic means for successively operating said movable means.

37. A machine for forming loops on opposite ends of binding wire for wirebound boxes comprising means for supporting a box blank having binding wire associated therewith, a pair of anvils positioned adjacent opposite sides of said blank, movable means adjacent each anvil for bending said wire about the anvil to form a loop, and separate hydraulic means operably associated with each of said movable means for operating the movable means.

38. A machine for forming loops on the ends of the wires of a wirebound box blank comprising means for supporting a box blank having a projecting end of wire, an anvil, a first movable means for partially bending said wire end about said anvil, a second movable means for further bending the wire end about said anvil to provide a loop, and hydraulic means for operating each of said movable means successively and in proper timed sequence.

39. A machine of the character described comprising means for supporting box blanks having a projecting end of binding wire, means for trimming said projecting wire end to a predetermined length, a rotatable anvil, means movable into engagement with the trimmed end of wire for partially bending the wire end around said anvil, separate means operating substantially at right angles to said last named means and movable into engagement with the wire for further bending said wire end about said anvil to form a loop, means for thereafter gripping said wire end, and means for then rotating said anvil to provide a twist in said wire.

40. A machine of the character described comprising means for supporting box blanks having a projecting end of binding wire, means for trimming said projecting wire end to a predetermined length, a rotatable anvil, means movable into engagement with the trimmed end of wire for partially bending the wire end around said anvil, separate means operating substantially at right angles to said last named means and movable into engagement with the wire for further bending said wire about said anvil to form a loop, means for thereafter gripping said wire end, means for then rotating said anvil to provide a twist in said wire, and means resiliently supporting said gripping means for movement towards said anvil during said twisting operation.

41. In a machine for the purpose specified, a rotary anvil mounted to rotate about a fixed axis inclined to the horizontal plane of the blank, means for wrapping the end portion of the wire about said anvil, means for then twisting the wire to form a loop, and means for stripping the loop from said anvil, said anvil having greater length than width, longitudinally of the machine, and being flat on its back and tapered at its front where it faces the blank.

WALTER F. NEWHOUSE.
LESLIE M. HILE.